United States Patent
Futaki

(10) Patent No.: US 9,735,934 B2
(45) Date of Patent: Aug. 15, 2017

(54) RADIO STATION, RADIO TERMINAL, AND METHOD FOR CONTROLING TRANSMISSION TIMING IN RADIO COMMUNICATION SYSTEM

(75) Inventor: Hisashi Futaki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/235,697

(22) PCT Filed: Jul. 12, 2012

(86) PCT No.: PCT/JP2012/004502
§ 371 (c)(1),
(2), (4) Date: Jan. 28, 2014

(87) PCT Pub. No.: WO2013/018290
PCT Pub. Date: Feb. 7, 2013

(65) Prior Publication Data
US 2014/0179331 A1    Jun. 26, 2014

(30) Foreign Application Priority Data
Jul. 29, 2011    (JP) .................... 2011-167799

(51) Int. Cl.
H04W 72/00    (2009.01)
H04L 5/00    (2006.01)
H04W 56/00    (2009.01)

(52) U.S. Cl.
CPC ....... H04L 5/0037 (2013.01); H04W 56/0005 (2013.01); H04W 56/0045 (2013.01)

(58) Field of Classification Search
None
See application file for complete search history.

(56) References Cited

U.S. PATENT DOCUMENTS

| | | | |
|---|---|---|---|
| 2009/0111445 A1* | 4/2009 | Ratasuk et al. | 455/418 |
| 2010/0061302 A1* | 3/2010 | Ishii et al. | 370/328 |
| 2010/0080155 A1* | 4/2010 | Suzuki et al. | 370/310 |

(Continued)

FOREIGN PATENT DOCUMENTS

WO    WO 2008/155935 A1    12/2008

OTHER PUBLICATIONS

Fujitsu, "The Number of TAT Maintained in UE", 3GPP TSG-RAN WG2 Meeting #74, R2-113041, $3^{rd}$ Generation Partnership Project (3GPP), Mobile Competence Centre, 650, Route DES Lucioles, F-06921 Sophia-Antipolis Cedex, May 2011.

(Continued)

*Primary Examiner* — Moustapha Diaby
(74) *Attorney, Agent, or Firm* — Finnegan, Henderson, Farabow, Garrett & Dunner, L.L.P.

(57) ABSTRACT

A radio station, a radio terminal, and a method for transmission timing control in a radio communications system are provided that facilitate uplink-signal synchronization management in a plurality of cell groups. The radio station (10) calculates uplink-signal transmission timing adjustment values TA1 and TA2 for respective cell groups (1, 2), each of which includes at least one cell including an available uplink radio resource, and notifies the calculated uplink-signal transmission timing adjustment values TA1 and TA2 to the radio terminal (20) at a time.

42 Claims, 21 Drawing Sheets

(56) References Cited

U.S. PATENT DOCUMENTS

| | | | |
|---|---|---|---|
| 2010/0098051 A1* | 4/2010 | Uemura | 370/350 |
| 2010/0188982 A1* | 7/2010 | Kato et al. | 370/242 |
| 2010/0195507 A1* | 8/2010 | Marinier | H04L 1/20 370/242 |
| 2011/0038280 A1* | 2/2011 | Jung et al. | 370/254 |
| 2011/0158116 A1* | 6/2011 | Tenny et al. | 370/252 |
| 2011/0194432 A1* | 8/2011 | Kato et al. | 370/252 |
| 2011/0243102 A1* | 10/2011 | Sebire et al. | 370/336 |

OTHER PUBLICATIONS

Ericsson et al., "Multiple TA with a single TAT", 3GPP TSG-RAN WG2 #74, Tdoc R2-112984, 3$^{rd}$ Generation Partnership Project (3GPP), Mobile Competence Centre, 650, Route Des Lucioles, F-06921 Sophia-Antipolis Cedex, May 2011.

Interdigital Communications, "Support for multiple Timing Advance in LTE CA", 3GPP TSG-RAN WG2 #74, Tdoc R2-113255, 3$^{rd}$ Generation Partnership Project (3GPP), Mobile Competence Centre, 650, Route Des Lucioles, F-06921 Sophia-Antipolis Cedex, May 2011.

Itri, "Considerations on TAT for Multiple TAs", 3GPP TSG RAN WG2 #74, R2-113193, 3$^{rd}$ Generation Partnership Project (3GPP), Mobile Competence Centre, 650, Route Des Lucioles, F-06921 Sophia-Antipolis Cedex, May 2011.

Panasonic, "Time Alignment in case of multiple TA", 3GPP TSG-RAN WG2 #74, R2-112819, 3$^{rd}$ Generation Partnership Project (3GPP), Mobile Competence Centre, 650, Route Des Lucioles, F-06921 Sophia-Antipolis Cedex, May 2011.

Potevio, "Multi-TA assignment", 3GPP TSG-RAN WG2 Meeting #74, R2-113069, 3$^{rd}$ Generation Partnership Project (3GPP), Mobile Competence Centre, 650, Route Des Lucioles, F-06921 Sophia-Antipolis Cedex, May 2011.

Extended European Search Report mailed on Feb. 5, 2015 by the European Patent Office in counterpart European Patent Application No. 12819449.5.

Ericsson et al., "Multiple TA with a single TAT", 3GPP TSG-RAN WG2 Tdoc, R2-112984, Barcelona, Spain, May 2010.

3GPP TS 36.300 v10.3.0 (the Internet <URL> http:www.3gpp.org/ftp/Specs/html-info/36300.htm), Sections 5.5, 6.4, and 7.5, "no date available".

3GPP TS 36.321 v10.1.0 (the Internet <URL> http:www.3gpp.org/ftp/Specs/html-info/36321.htm), Section 5.2, "no date available".

Fujitsu, "The Number of TAT Maintained in UE", R2-113041, 3GPP TSG-RAN WG2 Meeting, R2-113041, Barcelona, Spain, May 2011.

International Search Report mailed Aug. 7, 2012.

NEC Corporation, "Number of TATs and SRS", 3GPP TSG-RAN2 Meeting #75, R2-114062, Internet URL:http://www.3gpp.org/ftp/tsg_ran/WG2_RL2/TSGR2_75/Docs/R2-114062.zip, Aug. 2011.

Japanese Office Action mailed on Feb. 24, 2016, by the Japanese Patent Office in counterpart Japanese Patent Application No. 2013-526728.

* cited by examiner

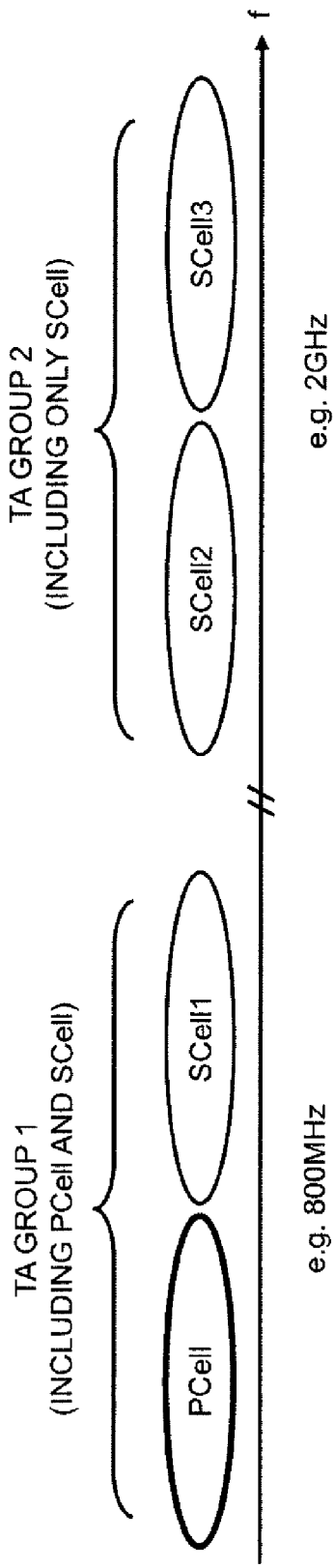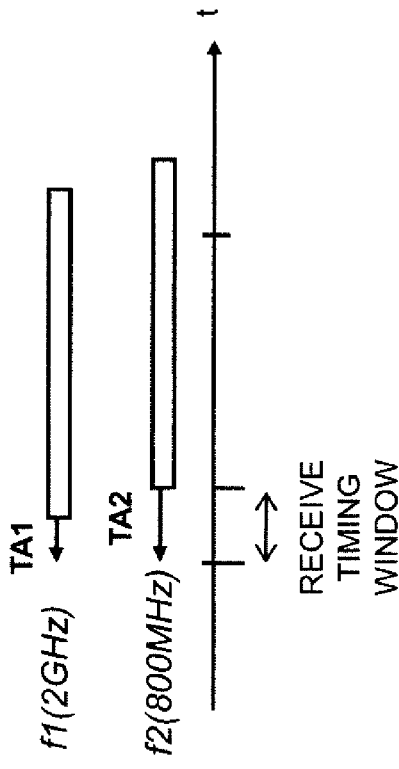

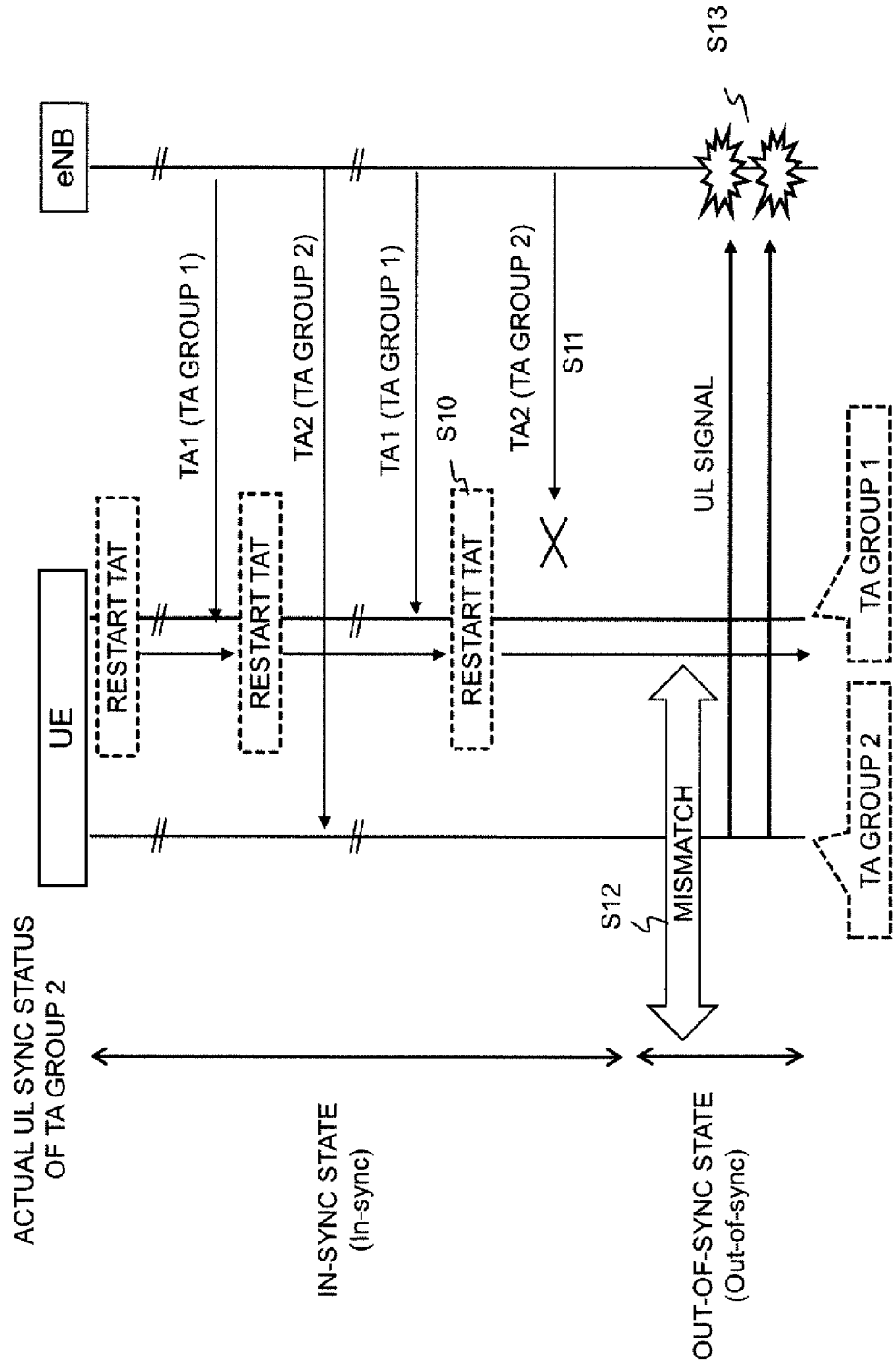

SEPARATE MESSAGES TRANSMITTED AT SAME TIMING

SINGLE MESSAGE

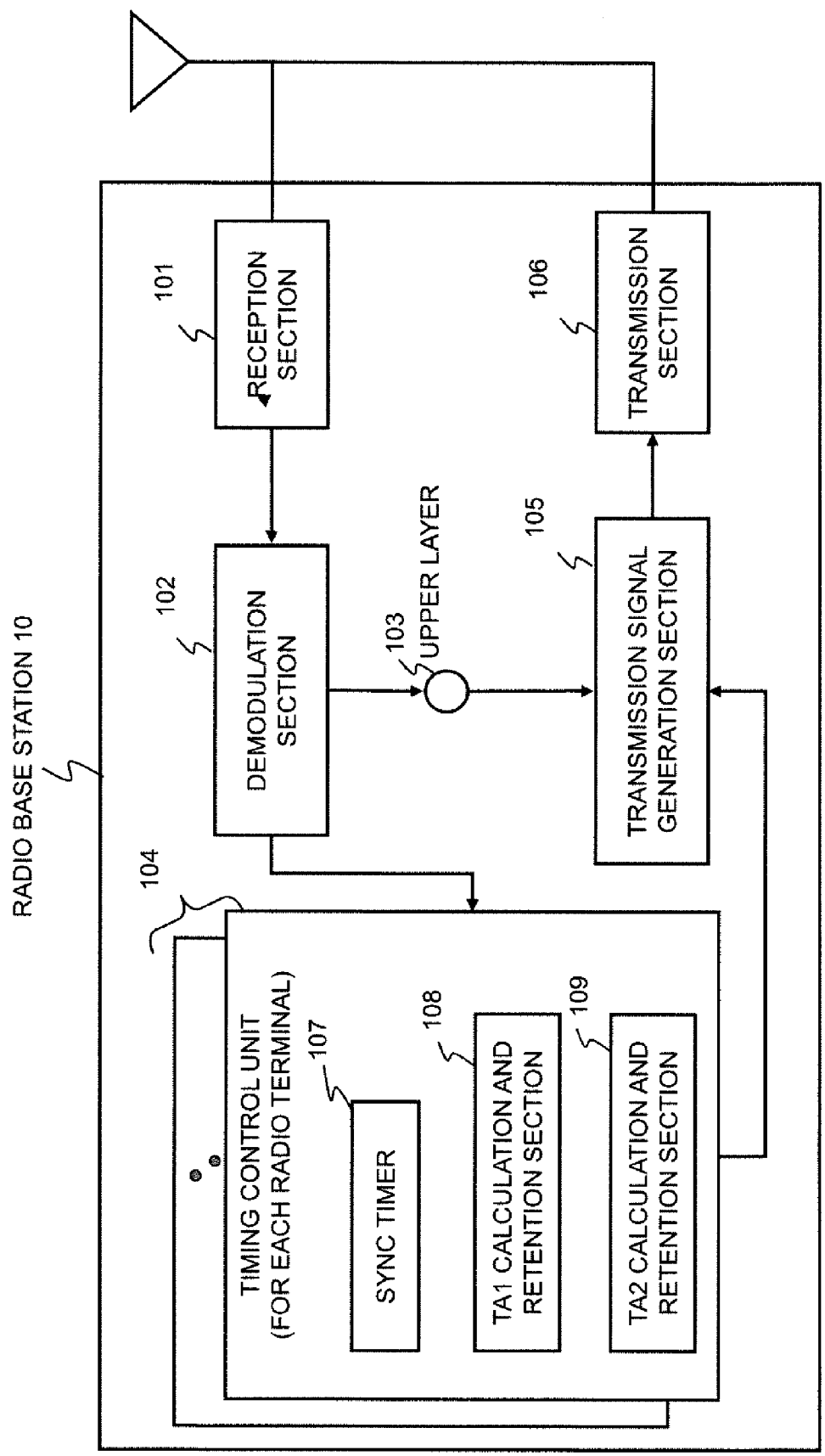

FIG. 17 TRANSMISSION TIMING CONTROL AT RADIO BASE STATION eNB (FOURTH EXAMPLE)

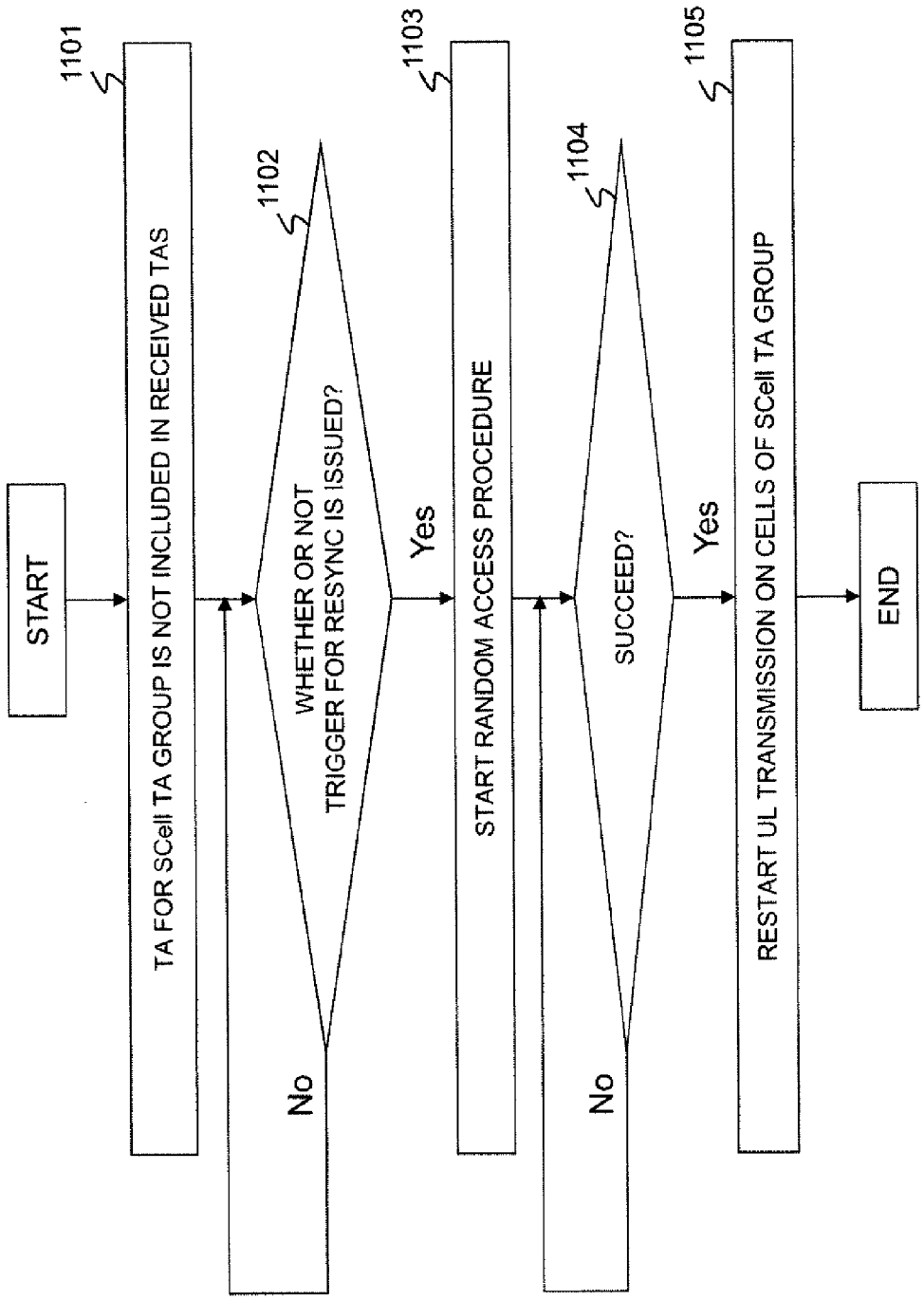

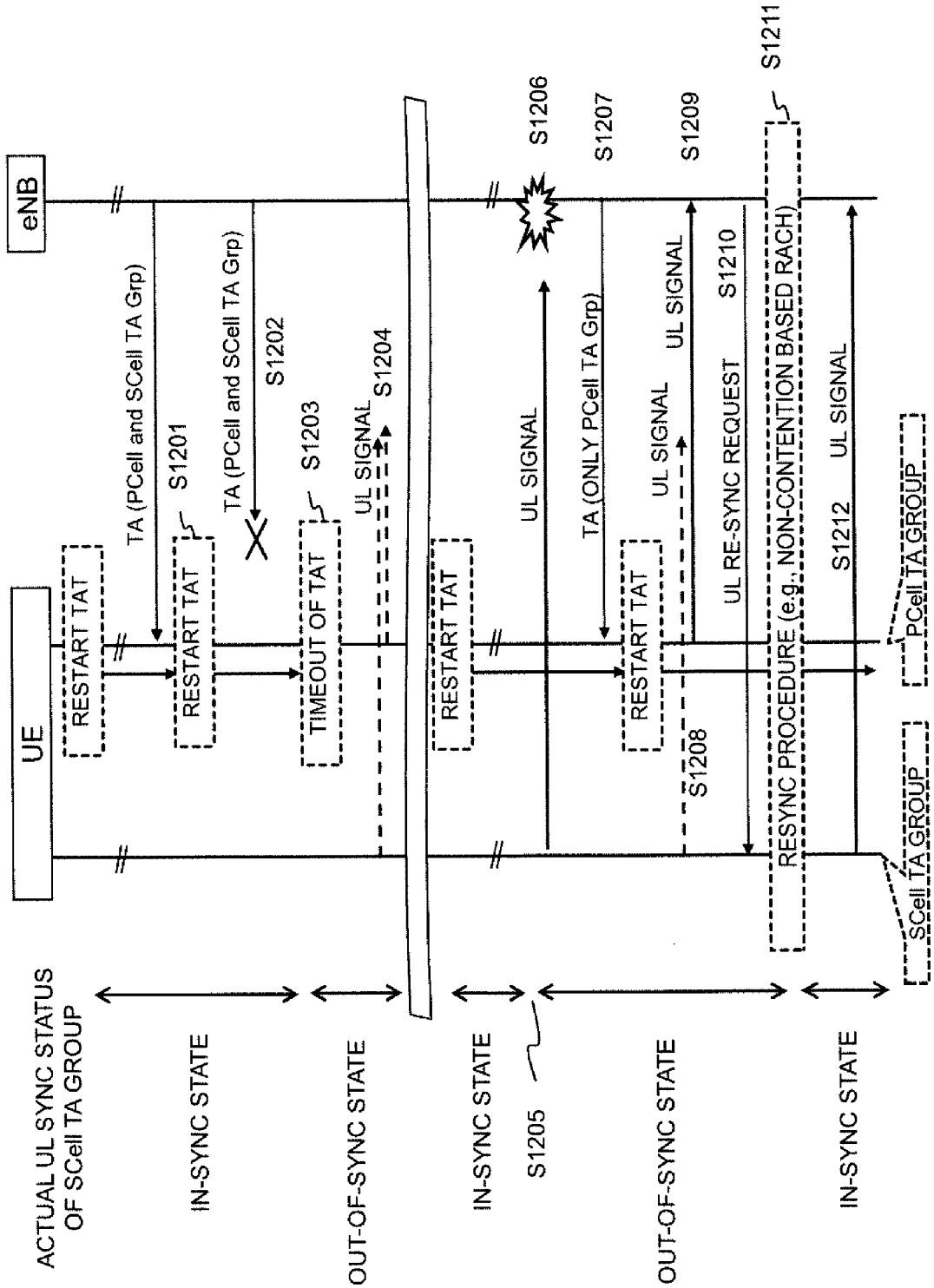

RADIO STATION, RADIO TERMINAL, AND METHOD FOR CONTROLING TRANSMISSION TIMING IN RADIO COMMUNICATION SYSTEM

CROSS-REFERENCE TO RELATED PATENT APPLICATIONS

This application is a National Stage Entry of International Application No. PCT/JP2012/004502, filed Jul. 12, 2012, which claims priority from Japanese Patent Application No. 2011-167799, filed Jul. 29, 2011. The entire contents of the above-referenced applications are expressly incorporated herein by reference.

TECHNICAL FIELD

The present invention relates to a radio communication system in which a radio terminal has a function of transmitting signals on multiple carriers or on multiple cells at the same time and, more particularly, to a radio station, a radio terminal, and a method for transmission timing control in the radio communication system.

BACKGROUND ART

In LTE (Long Term Evolution), which is one of the standards for radio communication systems defined by 3GPP (3rd Generation Partnership Project), radio resources including a time domain and a frequency domain are assigned to each radio terminal (User Equipment: UE) by using the TDM (Time Domain Multiplexing)/FDM (Frequency Domain Multiplexing) scheme. With respect to uplink signals transmitted by multiple radio terminals to a radio base station (enhanced Node B: eNB) in particular, the radio base station controls the transmission timing of an uplink signal of each radio terminal so that it is accommodated within a predetermined receive window at the radio base station. This control of uplink-signal transmission timing is performed by using the following two (NPL 1).

Uplink-signal transmission timing adjustment value (Timing Advance: TA)
Uplink-signal synchronization timer (Time Alignment Timer: TAT)

The transmission timing adjustment value TA is information indicating a value for a radio terminal to advance or delay the current transmission timing by a predetermined amount. The synchronization timer TAT indicates a duration for which the timing of receiving an uplink signal at a radio base station is accommodated within a predetermined window, that is, uplink-signal synchronization is guaranteed, with a transmission timing currently configured. The radio terminal is enabled to transmit uplink signals while the synchronization timer TAT is running, but does not transmit (is disabled to transmit) uplink signals when the synchronization timer TAT expires.

Moreover, in LTE-Advanced (LTE-A), which is a radio communications system advanced from LTE, the standardization of carrier aggregation (CA) is being proceeded, in which radio terminals use multiple component carriers (CC) at the same time to transmit and receive user data and the like (NPL 2). Each component carrier CC corresponds to one system bandwidth defined in LTE and can be thought to correspond to one cell. That is, a downlink component carrier CC and a corresponding uplink component carrier CC in combination are thought to be one cell. For example, transmission and reception on two downlink (or uplink) component carriers CC can be translated to transmission and reception on two cells. Accordingly, communication using a single uplink/downlink component carrier CC corresponds to communication on a single cell, and in the description hereinafter, both or one of the component carrier and the cell will be used appropriately.

Here, a component carrier CC that performs the most basic functions, such as obtaining system information required for a radio terminal to communicate with a radio base station, is referred to as primary component carrier (Primary CC: PCC) or primary cell (PCell), and other component carriers are referred to as secondary component carrier (Secondary CC: SCC) or secondary cell (SCell).

In LTE-A, studies have hitherto been proceeded on the premise that when carrier aggregation CA is performed, common uplink-signal transmission timing is used on multiple component carriers CC or multiple cells. That is, even when uplink signals are transmitted by using multiple component carriers (multiple cells), there is one uplink transmission timing adjustment value TA that a radio base station notifies to a radio terminal at certain time, and there also is one synchronization timer TAT for each radio terminal. Thereby, it is possible to easily perform uplink-signal transmission timing control without complicating the control even when carrier aggregation CA is performed.

On the other hand, in 3GPP, studies of a technology improved from the technology standardized as LTE-A have been started. Specifically, the technology has been discussed that makes carrier aggregation CA feasible even if uplink-signal transmission timing differs between a plurality of component carriers CC, that is, a plurality of cells. Factors causing uplink-signal transmission timing to differ between a plurality of component carriers CC (a plurality of cells) are different frequency bands, a repeater (reproduction station) being set for each frequency band (or only for a specific frequency band), and the like.

In 3GPP, a group of one or a plurality of component carriers (cells) on which uplink-signal transmission timing can be controlled in common is referred to as synchronization group (Timing Advance Group: TA Group). NPL 3 proposes a method for uplink-signal transmission timing control, in which the uplink-signal transmission timing adjustment value TA is controlled for each such TA Group on which timing control can be performed in common, and in which one common synchronization timer TAT is maintained for each radio terminal.

Hereinafter, a brief description will be given of a method for uplink-signal transmission timing control in a case where uplink-signal transmission timing differs between a plurality of component carriers CC (a plurality of cells), with reference to FIGS. 1 to 3.

Referring to FIG. 1, a system will be considered in which two TA Groups 1 and 2 with different uplink-signal transmission timings exist. Here, it is assumed that a primary cell PCell and a secondary cell SCell1 belong to the same TA Group 1, and secondary cells SCell2 and SCell3 belong to the same TA Group 2 as shown in FIG. 2A, and that to a radio base station eNB, a radio terminal UE performs uplink transmission by using the three secondary cells SCell1-3 in addition to the primary cell PCell. In this case, since uplink transmission timing differs between the TA Groups 1 and 2, uplink transmission timing adjustment values TA1 and TA2 for the respective TA Groups are configured so that uplink-signal reception timing at the radio base station eNB will be accommodated within a predetermined window as shown in FIG. 2B.

Moreover, referring to FIG. 3, according to the method for uplink transmission timing control (NPL 3), a radio terminal UE controls its synchronization timer TAT, linking it with uplink-signal transmission timing control on the TA Group 1 that includes the primary cell PCell. That is, the synchronization timer TAT is started upon establishment of uplink-signal synchronization in the TA Group 1. Thereafter, the synchronization timer TAT is started from an initial value each time an uplink-signal transmission timing adjustment value TA1 for the TA Group 1 is received (hereinafter, this will simply be referred to as "restart").

On the other hand, uplink-signal transmission timing control on the TA Group 2 is performed independently of the TA Group 1. When the radio base station eNB determines that an uplink transmission timing adjustment value TA2 for the TA Group 2 needs to be updated, the radio base station eNB notifies a transmission timing adjustment value TA2 to the radio terminal UE, and the radio terminal UE applies the received transmission timing adjustment value TA2. According to this control, the radio terminal UE commits uplink-signal synchronization in the TA Group 2 to the radio base station eNB. Accordingly, the radio base station eNB needs to appropriately update a transmission timing adjustment value TA2 so that uplink-signal synchronization in the TA Group 2 is guaranteed (details are all dependent on the implementation of the radio base station eNB). Thus, it is possible to transmit uplink signals at the same time in TA Groups with different uplink transmission timings, without increasing the load on a radio terminal UE.

CITATION LIST

Patent Literature

[NPL 1]
   3GPP TS 36.321 v10.1.0 (the Internet <URL>
http:www.3gpp.org/ftp/Specs/html-info/36321.htm), Section 5.2

[NPL 2]
   3GPP TS 36.300 v10.3.0 (the Internet <URL>
http:www.3gpp.org/ftp/Specs/html-info/36300.htm), Sections 5.5, 6.4, and 7.5

[NPL 3]
   3GPP RAN WG2 Contribution, R2-112984 (the Internet <URL>
http:www.3gpp.org/ftp/tsg_ran/WG2_RL2/TSGR2_74/Docs/R2-112984.zip)

SUMMARY OF INVENTION

Technical Problem

According to the above-described uplink transmission timing control in LTE, the transmission of uplink signals including user data and the like is stopped upon expiry of the synchronization timer TAT. Thereby, it is possible to avoid an interference from/to another radio terminal UE caused by transmission of an uplink signal in a situation where synchronization is not established.

However, as described above, the synchronization timer TAT is controlled, linked with the uplink transmission timing control on the TA Group 1 (primary synchronization group), while the uplink transmission timing control on the TA Group 2 is performed independently of the TA Group 1. Therefore, it is not based on the synchronization timer TAT in actuality whether or not uplink signals in the TA Group 2 including only the secondary cells SCell are actually in synchronization. During normal operation, there may be no significant problem because control is performed such that uplink-signal synchronization in the TA Group 2 is also established based on the synchronization timer TAT. However, in an error case, synchronization in the TA Group 2 is not guaranteed in actuality even if the synchronization timer TAT is running. Therefore, there is a possibility that a mismatch occurs between a result of synchronization determination based on the synchronization timer TAT and an actual synchronization status. Hereinafter, such an occurrence of a mismatch will be described with reference to FIG. 3.

Referring to FIG. 3, the radio base station eNB transmits respective transmission timing adjustment values TA1 and TA2 for the TA Groups 1 and 2 individually to the radio terminal UE. The radio terminal UE restarts the synchronization timer TAT only when a transmission timing adjustment value TA1 for the TA Group 1 is received (Step S10).

On the other hand, the radio base station eNB transmits a transmission timing adjustment value TA2 for the TA Group 2 in such a manner that uplink-signal synchronization in the TA Group 2 is guaranteed if the synchronization timer TAT at the radio terminal UE is running. At this time, if the radio terminal UE does not successfully receive a transmission timing adjustment value TA2 for the TA Group 2 (Step S11), a mismatch in the recognition of uplink-signal synchronization in the TA Group 2 occurs between the radio base station eNB and the radio terminal UE (Step S12).

That is, the radio base station eNB determines that the transmission timing adjustment value TA2 for the TA Group 2 is transmitted successfully, but in actuality, it is not received properly on the radio terminal UE side. Therefore, there is a possibility that uplink signals in the TA Group 2 will go out of synchronization at an earlier timing than the radio base station eNB supposes. More precisely, under normal operation, the radio terminal UE transmits Non-Acknowledgement (NACK) when it does not successfully (fails to) receive the transmission timing adjustment value TA2, and the radio base station eNB having received this retransmits the transmission timing adjustment value TA2. When the radio terminal UE successfully receives TA2, it transmits Acknowledgement (ACK), whereby the radio base station eNB can recognize the success.

On the other hand, there is a possibility of erroneous reception at the radio base station eNB, such as a case where Acknowledgement ACK or Non-Acknowledgement NACK transmitted by the radio terminal UE is erroneously recognized as the opposite answer (for example, NACK is received as ACK). This is a factor of the above-described mismatch (Step S12), but it is also another possible factor that the amount of variation in uplink-signal reception timing in the TA Group 2 is larger than the radio base station eNB supposes, resulting in a loss of synchronization occurring. In this case, the radio terminal UE cannot immediately detect that uplink signals in the TA Group 2 have gone out of synchronization (have lost synchronization). Therefore, transmission of an uplink signal is continued while it is out of (lose) synchronization (Step S13), which may interfere with an uplink signal from another radio terminal UE and may cause deterioration in the system characteristics such as throughput.

As described above, in a radio communications system in which uplink transmission timing differs between multiple component carriers (multiple cells corresponding thereto), in which there are synchronization groups each including one or more cells where the same uplink transmission timing can be used, and in which uplink-signal transmission timing control is performed by using only a synchronization timer TAT linked with uplink-signal synchronization in the primary synchronization group, it is important to appropriately perform uplink-signal synchronization management in a secondary synchronization group other than the primary synchronization group, in order to avoid an interference with another radio terminal and deterioration in the system characteristics.

Accordingly, an object of the present invention is to provide a radio station, a radio terminal, and a method for transmission timing control in a radio communication system that facilitate uplink-signal synchronization management in a plurality of synchronization groups.

Solution to Problem

A radio station according to the present invention is a radio station having a function of communicating with a radio terminal by using a plurality of radio resources that correspond respectively to a plurality of cells, characterized by comprising: calculation means that calculates an uplink-signal transmission timing adjustment value for each of cell groups, wherein each cell group includes at least one cell including an available uplink radio resource; and control means that notifies the calculated uplink-signal transmission timing adjustment values to the radio terminal at a time.

A method for transmission timing control at a radio station according to the present invention is a method for transmission timing control at a radio station having a function of communicating with a radio terminal by using a plurality of radio resources that correspond respectively to a plurality of cells, characterized by comprising: calculating an uplink-signal transmission timing adjustment value for each of cell groups, wherein each cell group includes at least one cell including an available uplink radio resource; and notifying the calculated uplink-signal transmission timing adjustment values to the radio terminal at a time.

A radio terminal according to the present invention is a radio terminal having a function of communicating with a radio station by using a plurality of radio resources that correspond respectively to a plurality of cells, characterized by comprising: reception means that receives respective uplink-signal transmission timing adjustment values for cell groups from the radio station at a time, wherein each cell group includes at least one cell including an available uplink radio resource.

A method for transmission timing control at a radio terminal according to the present invention is a method for transmission timing control at a radio terminal having a function of communicating with a radio station by using a plurality of radio resources that correspond respectively to a plurality of cells, characterized by comprising: receiving respective uplink-signal transmission timing adjustment values for cell groups from the radio station at a time, wherein each cell group includes at least one cell including an available uplink radio resource.

A radio communications system according to the present invention is a radio communications system in which a radio station and a radio terminal can communicate with each other by using a plurality of radio resources that correspond to a plurality of cells, characterized in that the radio station comprises: calculation means that calculates an uplink-signal transmission timing adjustment value for each of cell groups, wherein each cell group includes at least one cell including an available uplink radio resource; and notification means that notifies the calculated uplink-signal transmission timing adjustment values to the radio terminal at a time, and the radio terminal comprises reception means that receives the uplink-signal transmission timing adjustment values from the radio station.

Advantageous Effects of Invention

According to the present invention, it is possible to facilitate uplink-signal synchronization management in a plurality of cell groups (synchronization groups).

BRIEF DESCRIPTION OF DRAWINGS

FIG. 2A is a schematic diagram for describing carrier aggregation in the system shown in FIG. 1, and FIG. 2B is a schematic diagram for describing uplink-signal transmission timing adjustment values for the synchronization groups shown in FIG. 2A.

FIG. 3 is a sequence diagram showing operations of a radio terminal and a radio base station in transmission timing control shown in FIG. 2.

FIG. 8 is a block diagram showing a functional configuration of the radio base station according to the present exemplary embodiment.

FIG. 19 is a flowchart showing a resynchronization control operation in a SCell TA Group, in a method for transmission timing control according to a fifth example of the present invention.

FIG. 20 is a sequence diagram showing operations of the radio terminal and the radio base station in the radio communications system according to the fifth example of the present invention.

DESCRIPTION OF EMBODIMENTS

Figure 1:
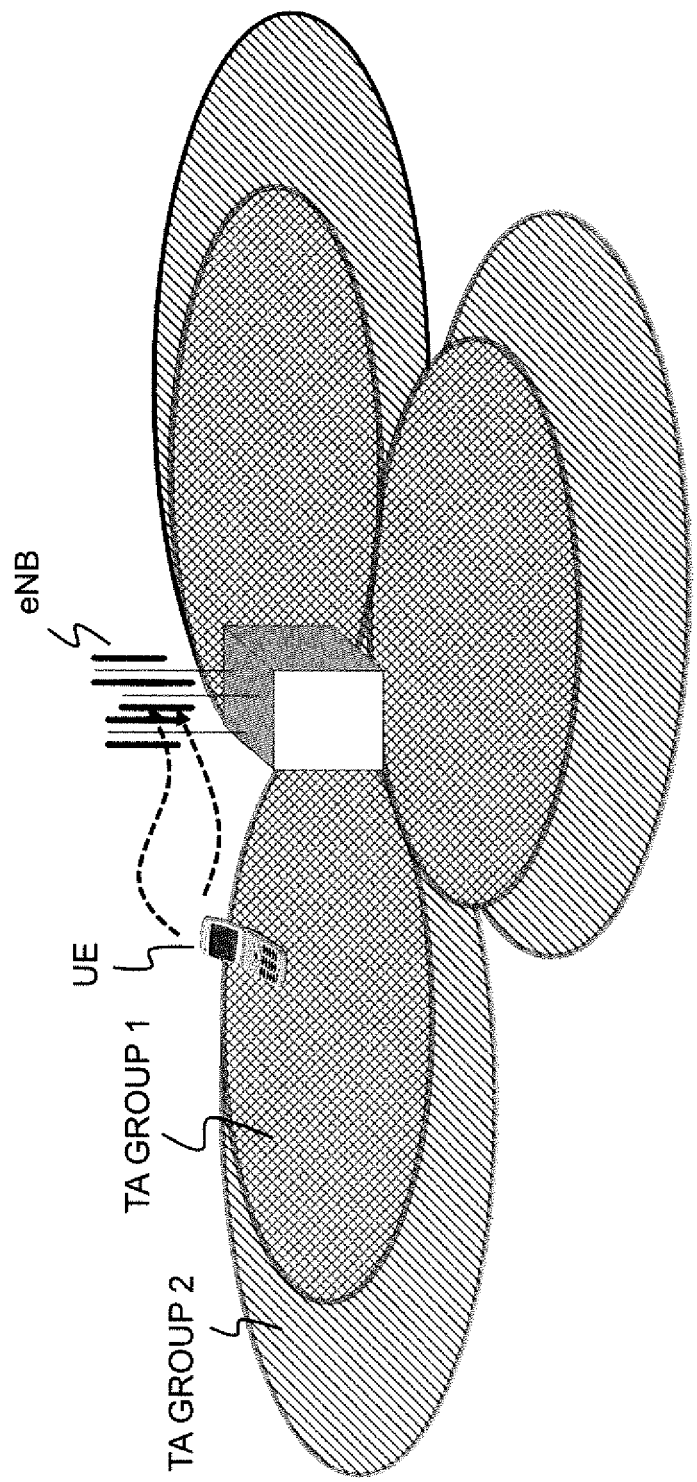
FIG. 1 is a schematic diagram of a system for describing synchronization groups in LTE-Advanced.

According to the present invention, uplink-signal transmission timing adjustment values are calculated respectively for all cell groups that include available radio resources (here, component carriers), among a plurality of cell groups each of which includes at least one cell and in which uplink-signal transmission timing and control thereof are independent of each other, and the respectively calculated uplink-signal transmission adjustment values are transmitted from a radio station to a radio terminal at a time. Thereby, synchronization management can be easily performed even if only one synchronization timer used to determine whether or not uplink signals are in synchronization is provided per radio terminal (or even if there are not synchronization timers respectively for cell groups). Moreover, thereby, the radio terminal can detect the cell groups that include available radio resources at the time of receiving the uplink-signal transmission timing adjustment values.

For example, a ground rule is established that a radio station transmits uplink-signal transmission timing adjustment values for cell groups that include available radio resources to a radio terminal at a time, whereby the radio terminal can detect a cell group including a radio resource on which an uplink signal is out of synchronization, among radio resources that the radio terminal has recognized as available. Specifically, the radio station transmits uplink-signal transmission timing adjustment values for cell groups in which uplink signals are in synchronization among all cell groups that include available radio resources, but does not transmit an uplink-signal transmission timing adjustment value for a cell group that loses uplink-signal synchronization. Thereby, the radio terminal can recognize the synchronization status of uplink signals on the available radio resources and can easily perform uplink-signal synchronization management in each cell group only by referring to a synchronization timer shared among a plurality of cell groups. Moreover, since the radio terminal can recognize, by receiving a message including transmission timing adjustment values, that a transmission timing adjustment value for a certain cell group is excluded, the radio terminal can easily learn that a loss of synchronization or the like has occurred in a cell belonging to that cell group and can avoid, at an early stage, an interference of an uplink signal with another radio terminal by stopping uplink-signal transmission on the cells of the cell group where the loss of synchronization has occurred.

Note that the radio station detects a loss of uplink-signal synchronization in cases, for example, where a predetermined uplink signal required to calculate an uplink-signal transmission timing adjustment value cannot be received (detected) during a predetermined duration (even though instructions to transmit it have been issued), where an uplink-signal transmission timing adjustment amount calculated upon receiving a predetermined uplink signal exceeds a predetermined value, or the like. Hereinafter, an exemplary embodiment and some examples of the present invention will be described in detail.

1. Exemplary Embodiment 1.1) System Architecture

It is assumed in an exemplary embodiment of the present invention that a radio communication system includes a radio station and a radio terminal, and the radio station may be a radio base station, a base station controller, or the like. In the present exemplary embodiment and examples, which will be described later, a description will be given assuming that the radio station is a radio base station as an example.

Figure 4:
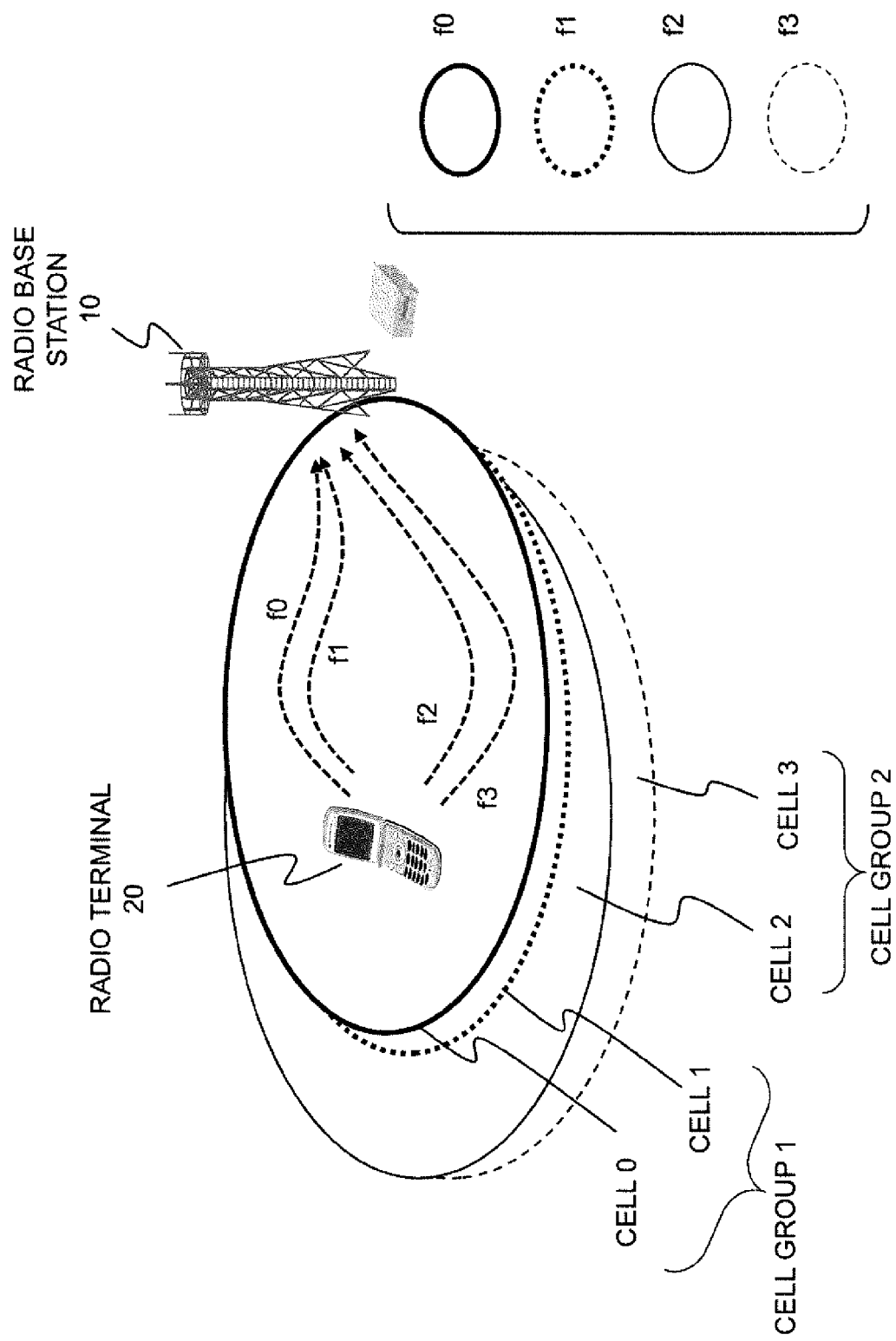
FIG. 4 is a schematic diagram showing an example of synchronization groups for describing carrier aggregation in a radio communications system according to an exemplary embodiment of the present invention.

FIG. 4 shows only one sector in order to avoid complicating the drawing, but an ordinary configuration includes a plurality of sectors. A radio base station 10 manages cells 0 to 3 using four frequency bands f0, f1, f2, and f3, and a radio terminal 20 can transmit multiple uplink signals by using a plurality of frequency bands at the same time. That is, the radio terminal 20 can transmit uplink signals by using, at the same time, all or some of an uplink radio resource on the cell 0 of the frequency band f0 (hereinafter, simply referred to as cell 0), an uplink radio resource on the cell 1 of f1 (hereinafter, simply referred to as cell 1), an uplink radio resource on the cell 2 of f2 (hereinafter, simply referred to as cell 2), and an uplink radio resource on the cell 3 of f3 (hereinafter, simply referred to as cell 3), wherein the radio resources meet a predetermined condition. The predetermined condition here is that, for example, in accordance with uplink radio resource configuration information received from the radio base station 10, this radio resource is (explicitly or inexplicitly) activated and is in an available state.

Moreover, these plurality of cells 0 to 3 (that is, the respective uplink radio resources) are grouped in accordance with a predetermined rule, and here it is assumed that the cells 0 and 1 are grouped into a cell group 1 and the cells 2 and 3 are grouped into a cell group 2. The predetermined rule here is that, for example, propagation delays (propagation characteristics) are identical (similar) and so the same uplink-signal transmission timing adjustment value can be applied (used) (transmission timing configuration can be shared). Uplink-signal transmission timing control of the radio terminal 20 is performed in such cell group units.

Moreover, a synchronization timer used to determine whether or not uplink signals are in synchronization is provided to each of the radio base station 10 and the radio terminal 20. It is determined that uplink signals are in synchronization when the synchronization timer is running, and it is determined that uplink signals are out-of-synchronization after the synchronization timer expires. The synchronization timer is controlled such as to operate (start, restart, or stop) linked with uplink transmission timing control on a specific one cell group (here, the cell group 1). Specifically, the synchronization timer provided to the radio base station 10/radio terminal 20 is started or restarted each time information indicating a "transmission timing adjustment value" for adjusting uplink-signal transmission timing on the cells of the cell group 1 is transmitted/received, but is not started or restarted when a transmission timing adjustment value for the cells of the cell group 2 is transmitted/received.

Note that a cell group with which the operation of the synchronization timer is linked is not necessarily the cell group 1 but may be the cell group 2. Moreover, a "cell group" here does not always need to include a plurality of cells as shown in FIG. 4, but some cell group may include only one cell.

Figure 5:
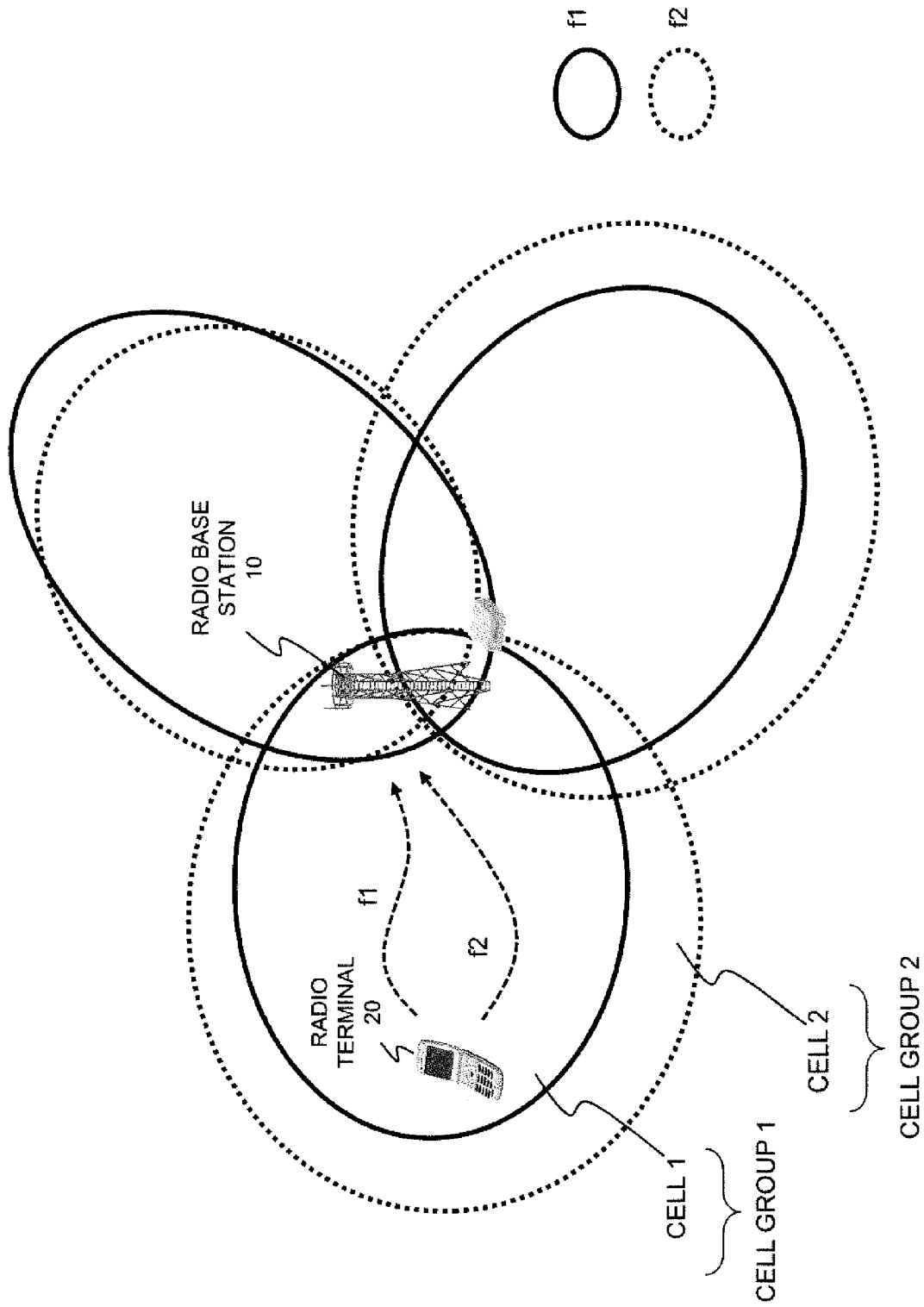
FIG. 5 is a schematic diagram showing another example of synchronization groups for describing carrier aggregation in the radio communications system according to the present exemplary embodiment.

Hereinafter, transmission timing control according to the present exemplary embodiment will be described by taking, as an example, a system in which the cell group 1 includes only a cell 1 and the cell group 2 includes only a cell 2 as shown in FIG. 5, for simplicity. However, it is obvious from a description below that the present invention can similarly be applied to a system in which a cell group includes a plurality of cells. Moreover, although shown in FIG. 5 is a 3-sector configuration (three sector cells per radio base station), the present invention is not limited to this but can similarly be applied to configurations other than the 3-sector one such as, for example, 1-sector and 6-sector ones.

1.2) Transmission Timing Control

Figure 6:
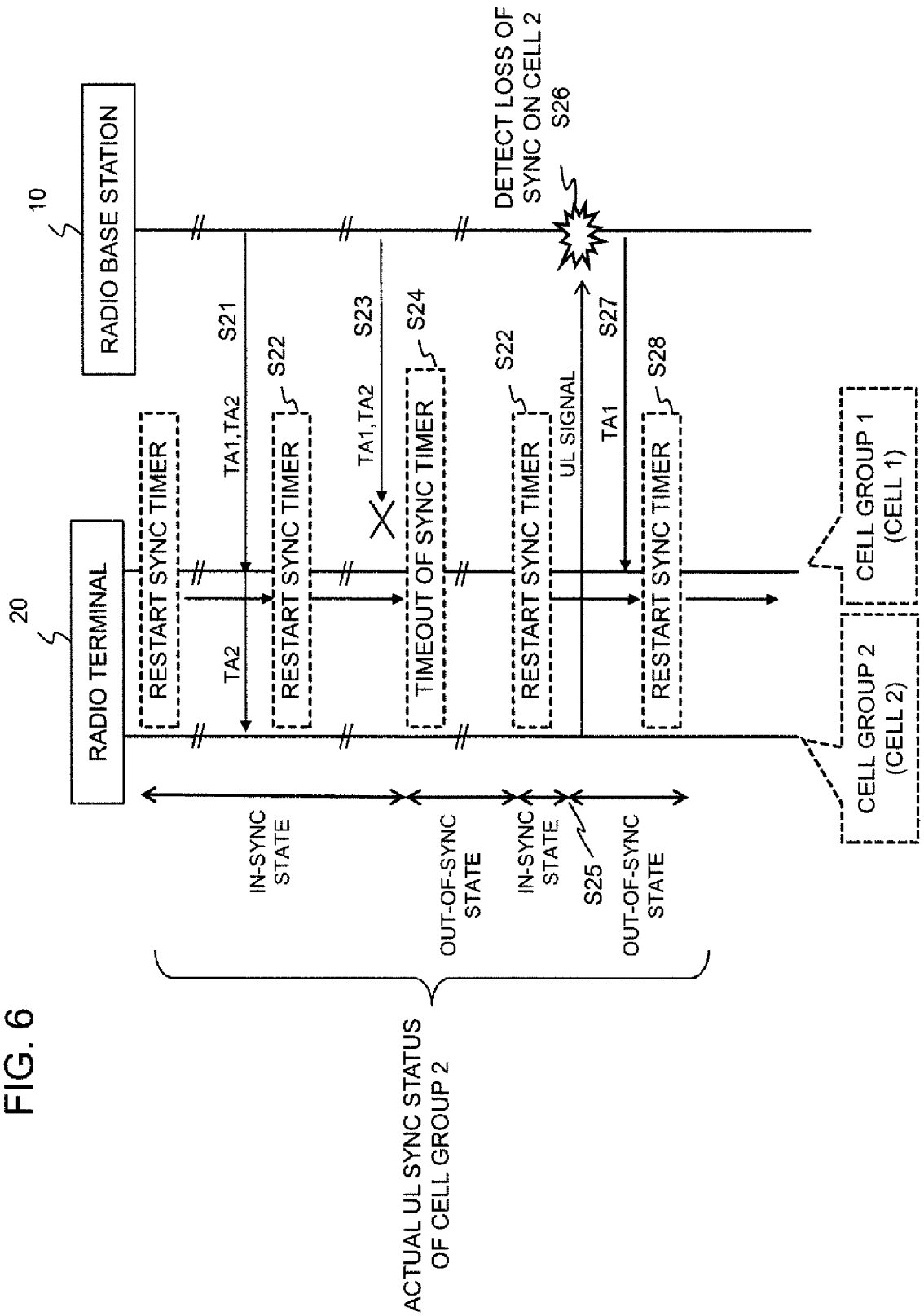
FIG. 6 is a sequence diagram showing operations of a radio terminal and a radio base station in the radio communications system according to the present exemplary embodiment.

The radio base station 10 transmits, at a time, transmission timing adjustment values for all cell groups that are used by the radio terminal 20 to transmit uplink signals. Referring to FIG. 6, the radio base station 10 transmits, at a time, transmission timing adjustment values TA1 and TA2 for the cell group 1 (cell 1) and the cell group 2 (cell 2) (Step S21). The radio base station 10, when transmitting the transmission timing adjustment values TA1 and TA2, restarts the synchronization timer (TAT) which is provided corresponding to the radio terminal 20.

The radio terminal 20, when receiving the transmission timing adjustment values from the radio base station 10, determines whether or not both of the transmission timing adjustment values TA1 and TA2 for the cell group 1 (cell 1) and the cell group (cell 2) are received. When both of the transmission timing adjustment values TA1 and TA2 are received, the radio terminal 20 updates uplink-signal transmission timing on the cell of each corresponding cell group, and restarts its own synchronization timer (Step S22). As long as transmission timing adjustment values TA1 and TA2 are successfully received and the synchronization timer is running, the uplink synchronization status of the cell group 1 (cell 1) and the cell group 2 (cell 2) is an in-synchronization state, in which uplink-signal transmission is enabled.

When the radio terminal 20 does not receive either of transmission timing adjustment values TA1 and TA2 or cannot receive them due to a link failure or the like (Step S23), the uplink synchronization status of the cell group 1 (cell 1) and the cell group 2 (cell 2) becomes an out-of-synchronization state upon expiry of its own synchronization timer (Step S24), and uplink-signal transmission is not performed.

On the other hand, it is assumed that after the radio terminal 20 restarts its own synchronization timer, the cell 2 of the cell group 2 loses synchronization, resulting in the synchronization status of the cell group 2 becoming an out-of-synchronization state (Step S25). In this case, even if the radio terminal 20 transmits an uplink signal to the radio base station 10 on the cell 2 of the cell group 2, the radio base station 10 detects a loss of synchronization and cannot receive the uplink signal (Step S26). When a loss of synchronization in the cell group 2 is thus detected, the radio base station 10 excludes an uplink-signal transmission timing adjustment value TA2 for the cell group 2 (cell 2) in which a loss of synchronization is detected, and transmits only an uplink-signal transmission timing adjustment value TA1 for the cell group 1 (cell 1) to the radio terminal 20 (Step 27).

When the uplink-signal transmission timing adjustment value TA1 for the cell group 1 (cell 1) only is notified, the radio terminal 20 recognizes that the uplink synchronization status of the other cell group 2 (cell 2) is an out-of-synchronization state, and stops transmission of an uplink signal in the cell group 2 (cell 2) while maintaining the synchronization in the cell group 1 (cell 1) by restarting its own synchronization timer. Note that the radio terminal 20 can start a procedure for uplink resynchronization in the cell group 2 (cell 2), at a request for resynchronization from the radio base station 10.

Figure 7B:
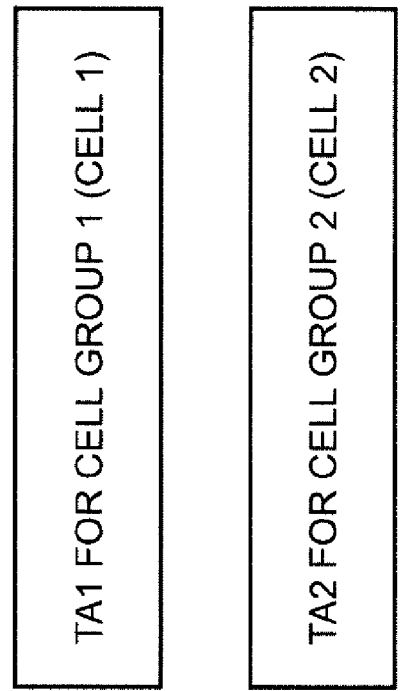
FIG. 7B is a schematic diagram showing another example of messages transmitting uplink transmission timing adjustment values.
Figure 7A:
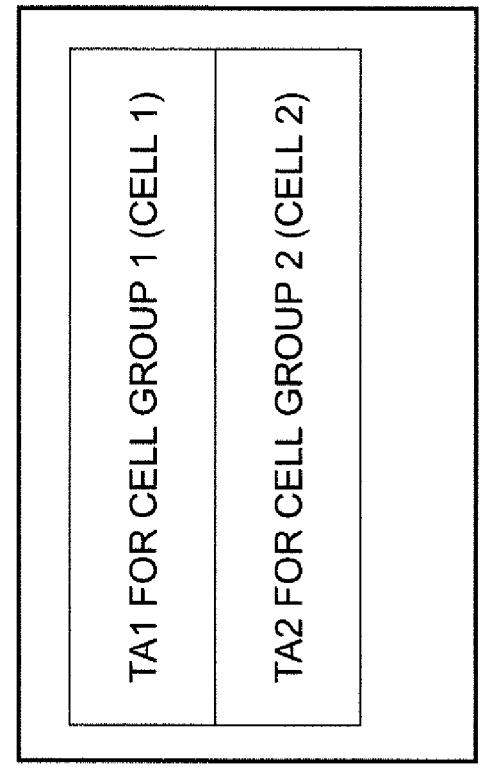
FIG. 7A is a schematic diagram showing an example of a message transmitting uplink transmission timing adjustment values.

As described above, the radio base station 10 transmits transmission timing adjustment values TA1 and TA2 for the cell group 1 (cell 1) and the cell group 2 (cell 2) to the radio terminal 20 at a time, not separately or individually as shown in FIG. 3. Here, "transmitting at a time" a plurality of transmission timing adjustment values means transmitting them together in a single collective operation. For example, a possible method is a method in which TA1 and TA2 are included in a single message and transmitted as shown in FIG. 7A, a method in which TA1 and TA2 are transmitted at the same time by using separate messages as shown in FIG. 7B, or the like.

1.3) Effects

As described above, the radio base station 10 according to the present exemplary embodiment transmits uplink-signal transmission timing adjustment values for all available cell groups to the radio terminal 20 at a time and thereby can notify information about radio resources (cells) that are available at that time to the radio terminal 20. In this event, uplink-signal transmission timing adjustment values for all available cell groups are transmitted, but an uplink-signal transmission timing adjustment value for a cell group that loses uplink-signal synchronization is not transmitted, whereby the radio terminal can easily recognize the occurrence of a loss of synchronization in a cell belonging to the cell group for which a transmission timing adjustment value is excluded. Accordingly, the radio terminal can avoid an interference of an uplink signal with another radio terminal at an early stage by stopping uplink-signal transmission on the cell of the cell group that loses synchronization.

2. Functional Configurations of Radio Station and Radio Terminal

Referring to FIG. 8, the radio base station 10 as a radio station includes a reception section 101 that receives signals from a plurality of radio terminals individually and a demodulation section 102 that demodulates the received signals, and received user data is processed at an upper layer 103. A timing control unit 104 is provided correspondingly for each of the plurality of radio terminals and transmits uplink-signal transmission timing adjustment values as described above for the cells of groups used by each radio terminal, thus controlling the transmission timings of uplink signals to be transmitted by the corresponding radio terminal. A transmission signal generation section 105 generates downlink signals to the radio terminals, and a transmission section 106 transmits the downlink signals.

The timing control unit 104 has following functional blocks: a synchronization timer 107 used to determine whether or not uplink signals of a radio terminal are in synchronization; a TA1 calculation and retention section 108 that calculates and retains a transmission timing adjustment value TA1 for the cell of the cell group 1; and a TA2 calculation and retention section 109 that calculates and retains a transmission timing adjustment value TA2 for the cell of the cell group 2.

Figure 9:
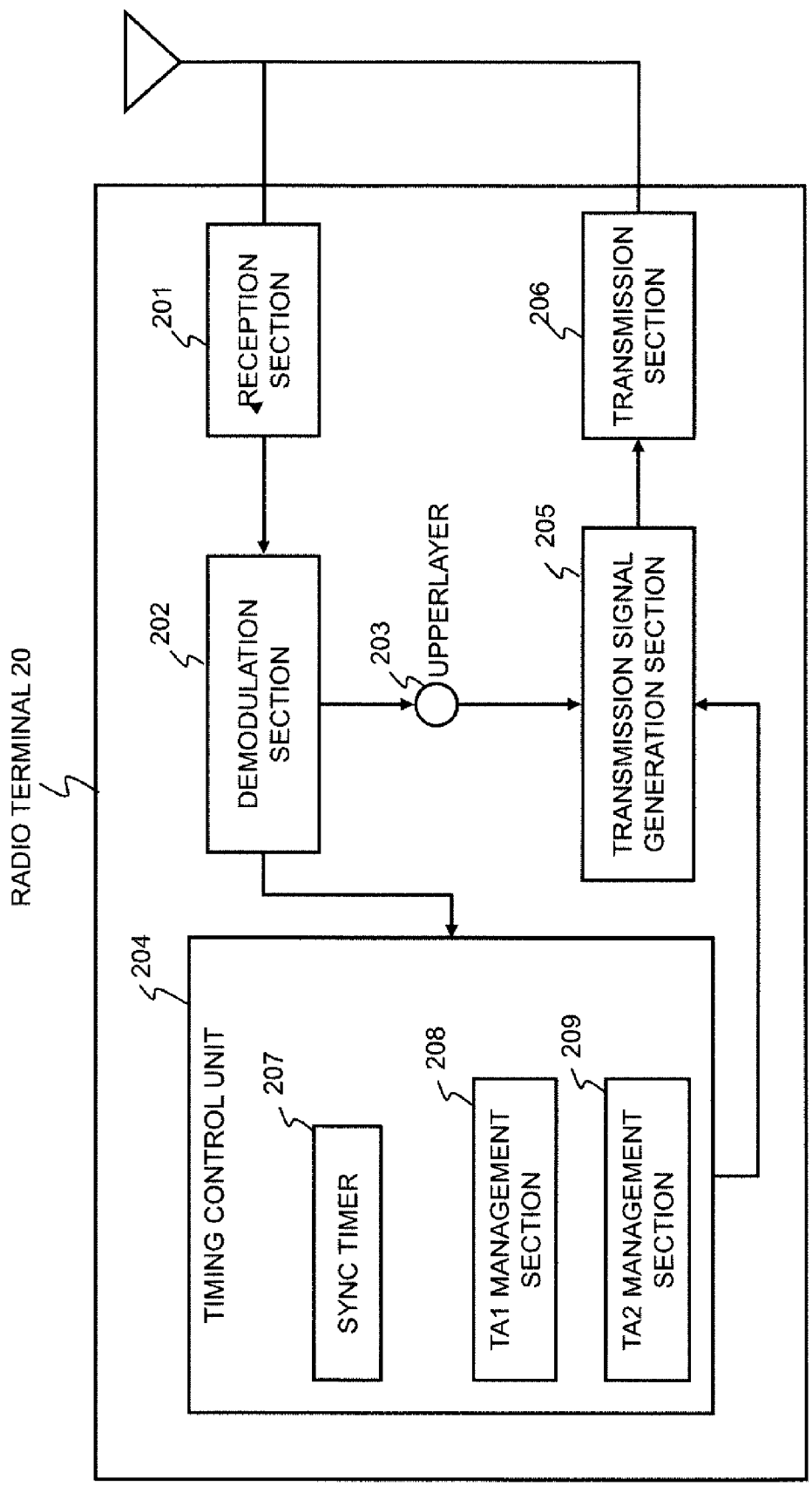
FIG. 9 is a block diagram showing a functional configuration of the radio terminal according to the present exemplary embodiment.

Referring to FIG. 9, the radio terminal 20 includes a reception section 201 that receives a signal from the radio base station 10, a demodulation section 202 that demodulates the received signal, an upper layer 203 that processes downlink data, a timing control unit 204 that performs uplink-signal transmission timing control in accordance with uplink-signal transmission timing adjustment values from the radio base station 10, a transmission signal generation section 205 that generates an uplink signal to the radio base station 10, and a transmission section 206 that transmits the uplink signal.

The timing control unit 204 has a function of determining, based on (the reception of a message or messages including) uplink-signal transmission timing adjustment values from the radio base station 10, the uplink synchronization status of each cell group when uplink-signal transmission is performed by using a plurality of cells, and further has following functional blocks: a synchronization timer 207 used to determine whether or not uplink-signal transmission timing is in synchronization; a TA1 management section 208 that controls transmission timing on the cell of the cell group 1 in accordance with an uplink-signal transmission timing adjustment value TA1 from the radio base station 10; and a TA2 management section 209 that controls transmission timing on the cell of the cell group 2 in accordance with an uplink-signal transmission timing adjustment value TA2 from the radio base station 10.

Note that the functions of the timing control unit 104 of the radio base station 10 shown in FIG. 8 can be implemented by executing programs stored in a memory (not shown) on a program-controlled processor such as a CPU. Similarly, the functions of the timing control unit 204 of the radio terminal 20 shown in FIG. 9 can also be implemented by executing programs stored in a memory (not shown) on a program-controlled processor such as a CPU.

Hereinafter, concrete examples of the transmission timing control at the radio base station 10 and the radio terminal 20 shown in FIGS. 8 and 9 will be described in detail with reference to FIGS. 10 to 21.

3. First Example

3.1) Transmission Timing Control

Figure 10:
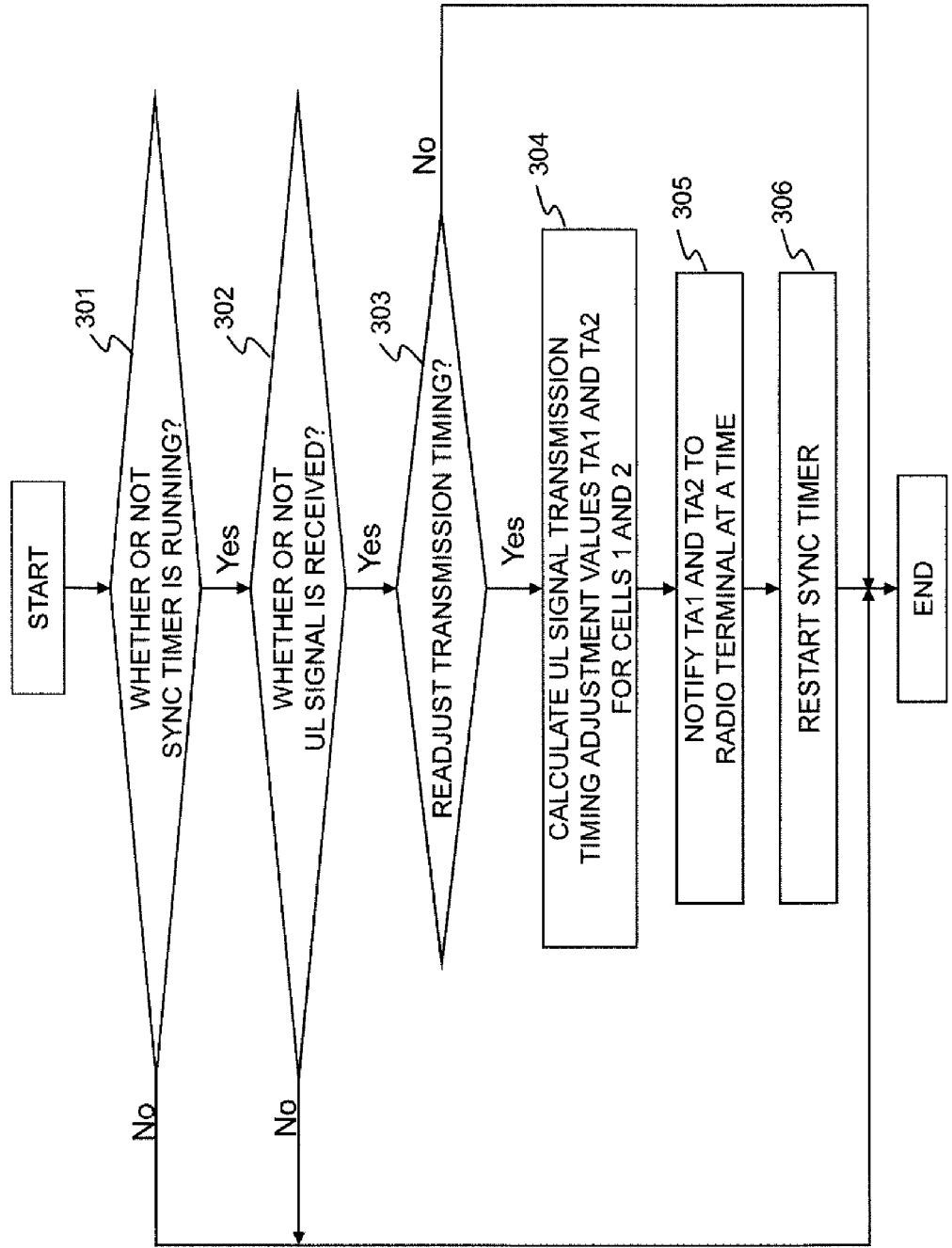
FIG. 10 is a flowchart showing a basic operation of the radio base station in a method for transmission timing control according to a first example of the present invention.
Figure 11:
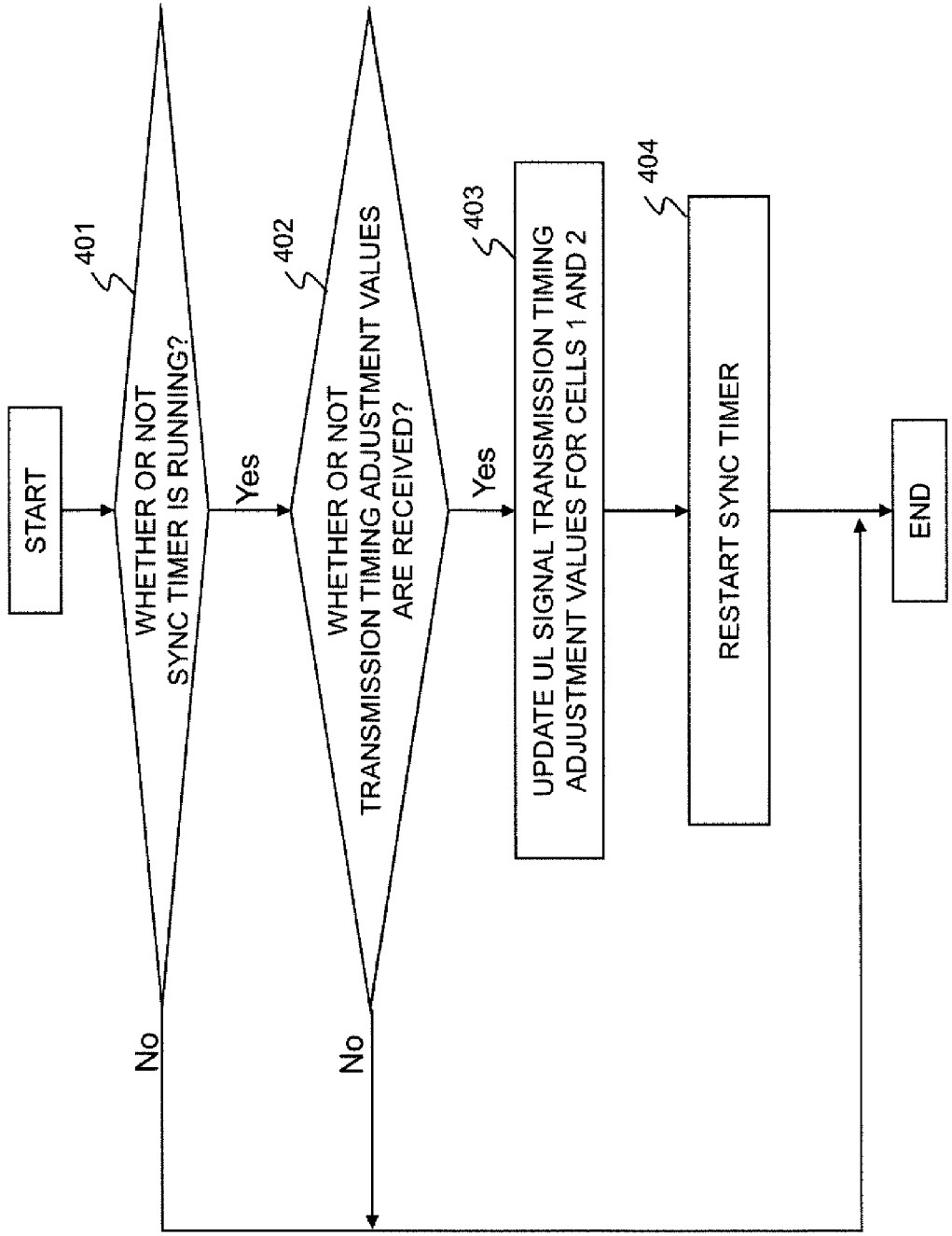
FIG. 11 is a flowchart showing a basic operation of the radio terminal in the method for transmission timing control according to the first example of the present invention.

FIGS. 10 and 11 show basic operations of the radio base station 10 and the radio terminal 20 according to a present example, respectively. Here, it is assumed that the radio terminal 20 uses both the cells 1 and 2 to transmit uplink signals as long as uplink signals on both the cell 1 of the cell group 1 and the cell 2 of the cell group 2 are in synchronization.

Referring to FIG. 10, the timing control unit 104 of the radio base station 10 first determines whether or not the synchronization timer 107 corresponding to a target radio terminal is running (Step 301) and, when the synchronization timer 107 is running (Step 301; Yes), determines whether or not uplink signals are received from the radio terminal (Step 302). If uplink signals are received (Step 302; Yes), the timing control unit 104 determines whether or not readjustment (updating) of uplink-signal transmission timing is required (Step 303).

When it is determined that readjustment of uplink-signal transmission timing is required (Step 303; Yes), the TA1 calculation and retention section 108 and the TA2 calculation and retention section 109 calculate transmission timing adjustment values TA1 and TA2 for the cell 1 of the cell group 1 and for the cell 2 of the cell group 2, respectively (Step 304). The transmission signal generation section 105 generates a transmission signal by using these transmission timing adjustment values TA1 and TA2, notifies them to the radio terminal at a time (Step 305), restarts (starts from a set value of) the synchronization timer 107 (Step 306), and then finishes the processing. Note that the processing is also finished when the synchronization timer 107 expires (Step 301; No), when no uplink signals are received (Step 302; No), or when readjustment of transmission timing is not required (Step 303; No).

Referring to FIG. 11, the timing control unit 204 of the radio terminal 20 determines whether or not the synchronization timer 207 is running (Step 401) and, when the synchronization timer 207 is running (Step 401; Yes), determines whether or not uplink-signal transmission timing adjustment values are received (Step 402). When transmission timing adjustment values are received (Step 402; Yes), the TA1 management section 208 and the TA2 management section 209 update transmission timings on the cell 1 of the cell group 1 and on the cell 2 of the cell group 2, respectively (Step 403), restarts the synchronization timer 207 (Step 404), and then finishes the processing. Note that the processing is also finished when the synchronization timer 207 expires (Step 401; No), or when no uplink-signal transmission timing adjustment values are received (Step 402; No).

By performing the above-described transmission timing control, the radio base station 10 can easily perform uplink synchronization management in all groups based on only one synchronization timer 107, without using a plurality of synchronization timers even if, for example, a certain radio terminal 20 transmits uplink signals by using uplink radio resources on cells that respectively belong to a plurality of cell groups.

Note that if a plurality of cells is included in a single cell group as shown in FIG. 4, the radio base station 10 calculates an uplink-signal transmission timing adjustment value for each cell group and notifies them at a time to the radio terminal 20. In this event, an uplink signal on any of cells may be used to calculate a transmission timing adjustment value as long as the cells are of this cell group. When the transmission timing adjustment values are received, the radio terminal 20 applies, for each cell group, the received transmission timing adjustment value to all the cells included in the cell group.

Additionally, conceivable cases where uplink-signal transmission timing needs to be independently controlled between a plurality of cell groups are cases, for example, where the frequency band f1 of the cell 1 and the frequency band f2 of the cell 2 are greatly different (for example, 800 MHz and 2 GHz), where a repeater exists for each or one of the frequency bands f1 and f2, and the like.

3.2) Effects

Through the above-described basic operation for transmission timing control, when the radio base station 10 determines that readjustment of transmission timing is required for at least one cell group including a radio resource (cell) that is available from the viewpoint of a radio terminal, the radio base station 10 transmits respective uplink-signal transmission timing adjustment values for such cell groups to the radio terminal 20 at a time, whereby it is possible to easily perform uplink synchronization management.

4. Second Example

The radio base station 10 according to a second example of the present invention, in addition to the above-described basic operation, performs transmission timing adjustment value notification control, which will be described below, when a loss of synchronization is detected. That is, when it is detected that a cell that is being used is out of synchronization (loses synchronization) even though the synchronization timer 207 of the radio terminal 20 is running, the timing control unit 104 excludes a cell group including this cell and transmits to the radio terminal 20 transmission timing adjustment values calculated respectively for the other cell groups. Note that the present invention is assumed to be applied to control after uplink synchronization is once established, not applied to the initial establishment of uplink synchronization. For example, when uplink synchronization is established for the first time in a state where uplink synchronization is not established, a transmission timing adjustment value is independently transmitted for each cell group in response to a random access. However, the present invention is not limited to this example.

When a massage or messages including transmission timing adjustment values received from the radio base station 10 do not include a transmission timing adjustment value for a cell group for which a transmission timing adjustment value is to be received, the radio terminal 20 according to the present example stops transmission of an uplink signal on the cell of this cell group. Here, "stop" transmission corresponds, but is not limited, to not transmitting an uplink signal planned to be transmitted, not transmitting any uplink signal except a specific signal (for example, a signal transmitted by using a common radio resource shared among radio terminals, such as a random access preamble) even if instructions to transmit an uplink signal are received from the radio base station 10, or the like.

4.1) Transmission Timing Control

Hereinafter, operations for transmission timing control of the radio base station and the radio terminal according to the present embodiment will be described with reference to FIGS. 12 and 13. Here, for simplification, a description will also be given by taking a case, as an example, where the cell group 1 includes only the cell 1 and the cell group 2 includes only the cell 2 as shown in FIG. 5.

Figure 12:
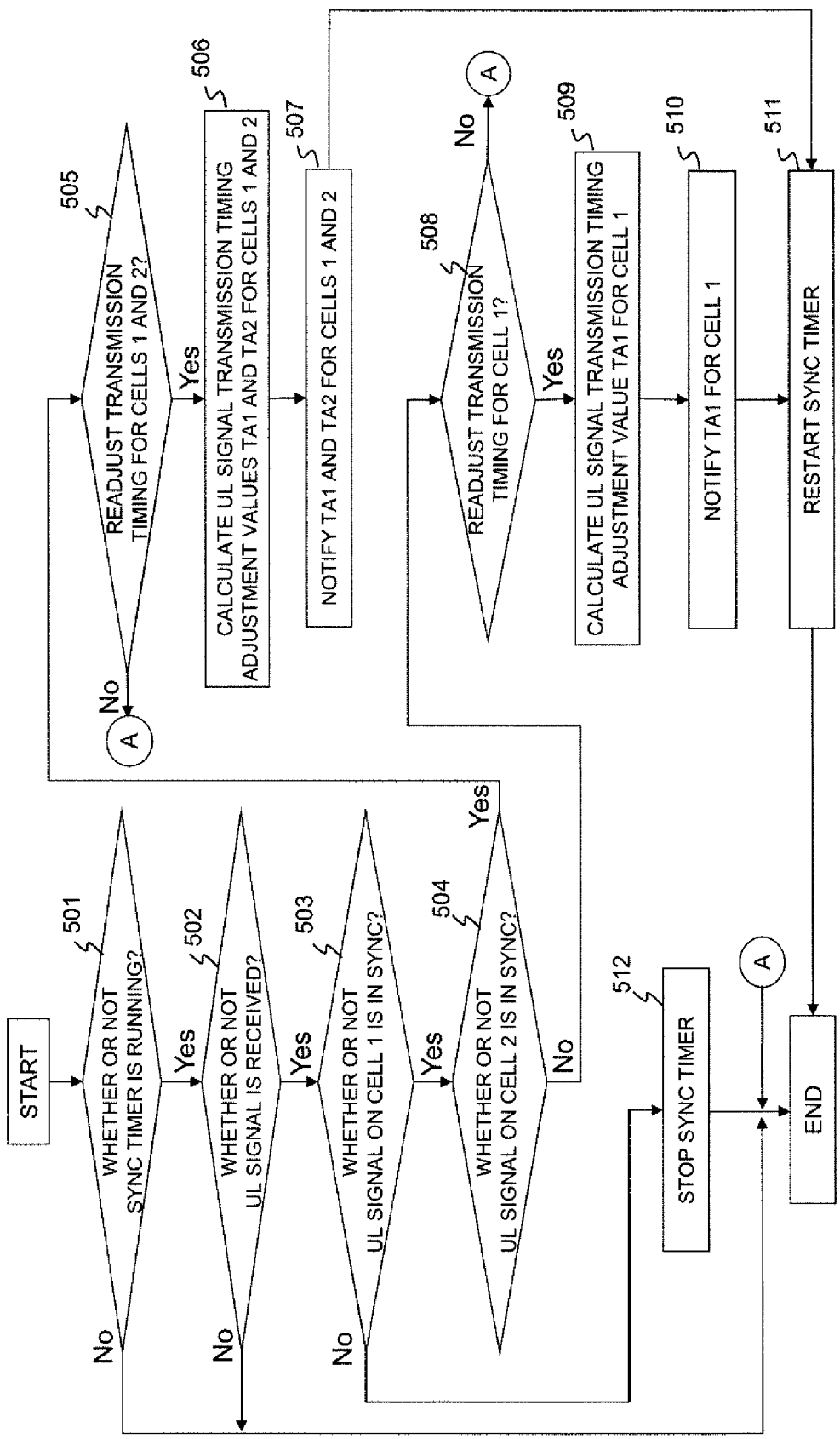
FIG. 12 is a flowchart showing a control operation of the radio base station in a method for transmission timing control according to a second example of the present invention.

Referring to FIG. 12, the timing control unit 104 of the radio base station 10 first determines whether or not the synchronization timer 107 for a target radio terminal is running (Step 501) and, when the synchronization timer 107 is running (Step 501; Yes), determines whether or not uplink signals are received from the radio terminal (Step 502). When uplink signals are received from the radio terminal (Step 502; Yes), it is determined whether or not an uplink signal on the cell 1 of the cell group 1 is actually in synchronization (Step 503). When an uplink signal on the cell 1 of the cell group 1 is in synchronization (Step 503; Yes), it is subsequently determined whether or not an uplink signal on the cell 2 of the cell group 2 is actually in synchronization (Step 504).

When an uplink signal on the cell 2 of the cell group 2 is also in synchronization (Step 504; Yes), it is determined whether or not readjustment (updating) of uplink-signal transmission timing is required (Step 505). When it is required (Step 505; Yes), then transmission timing adjustment values TA1 and TA2 are calculated for the cell 1 of the cell group 1 and for the cell 2 of the cell group 2 (Step 506), these transmission timing adjustment values TA1 and TA2 are notified together to the radio terminal (Step 507), and the synchronization timer 107 is restarted (Step 511). When readjustment (updating) of uplink-signal transmission timing is not required (Step 505; No), the processing is finished.

If an uplink signal on the cell 1 of the cell group 1 is in synchronization (Step 503; Yes) but an uplink signal on the cell 2 of the cell group 2 is not actually in synchronization (Step 504; Not), then it is determined whether or not readjustment (updating) of uplink-signal transmission timing is required for the cell 1 of the cell group 1 (Step 508). When it is required (Step 508; Yes), a transmission timing adjustment value TA1 is calculated for the cell 1 of the cell group 1 (Step 509), this transmission timing adjustment value TA1 is notified to the radio terminal (Step 510), and the synchronization timer 107 is restarted (Step 511).

When an uplink signal on the cell 1 of the cell group 1 is not actually in synchronization (Step 503; No), the synchronization timer 107 is stopped (Step 512), and the control flow for notifying an update on uplink transmission timing adjustment values is finished. Thereafter, if resynchronization is required, instructions for resynchronization are made to the radio terminal.

Note that the processing is also finished when the synchronization timer 107 expires (Step 501; No), when no uplink signals are received (Step 502; No), or when readjustment (updating) of uplink-signal transmission timing is not required for the cell 1 of the cell group 1 (Step 508; No).

Figure 13:
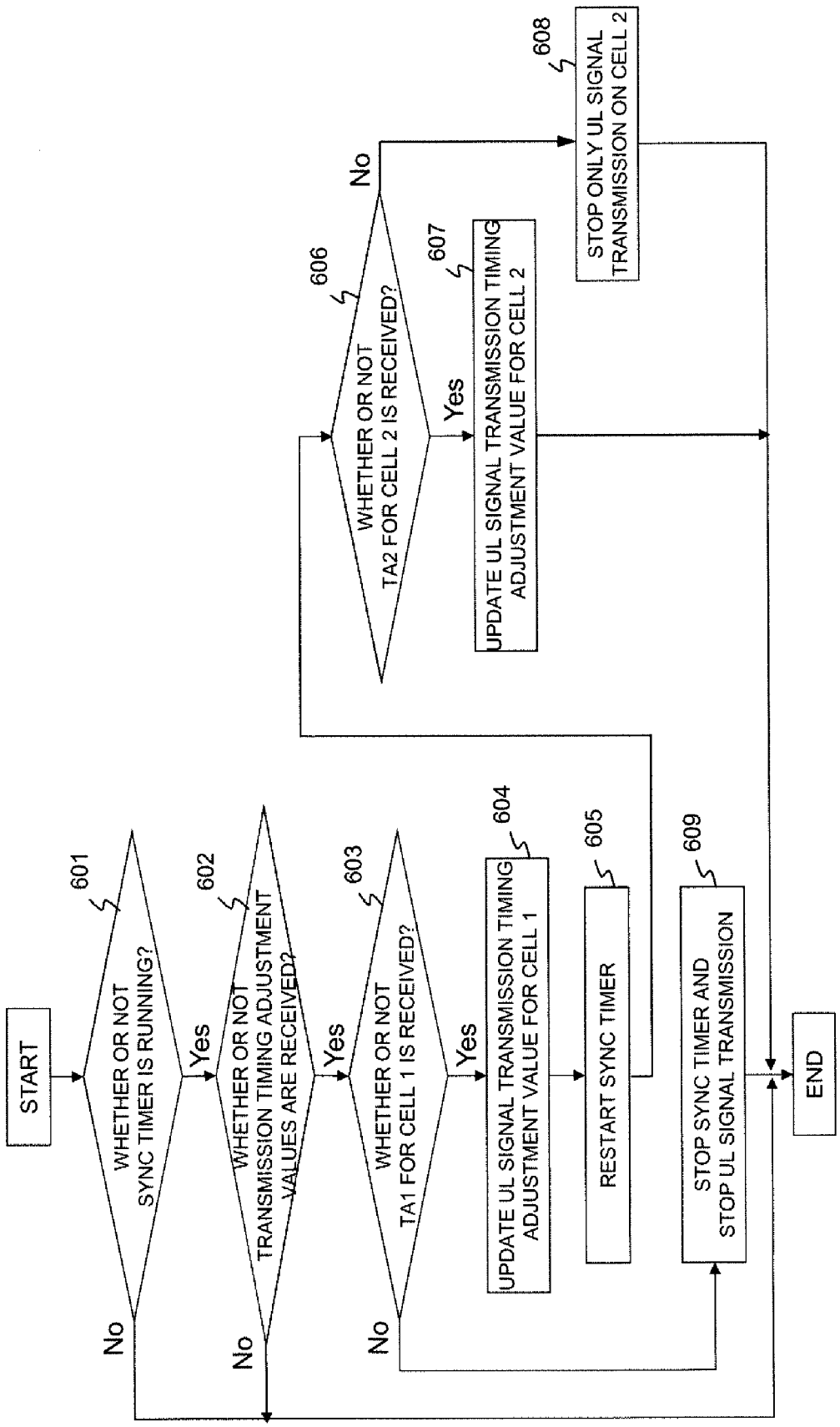
FIG. 13 is a flowchart showing a control operation of the radio terminal in the method for transmission timing control according to the second example of the present invention.

Referring to FIG. 13, the timing control unit 204 of the radio terminal 20 determines whether or not the synchronization timer 207 is running (Step 601) and, when the synchronization timer 207 is running (Step 601; Yes), determines whether or not uplink-signal transmission timing adjustment values are received (Step 602). If uplink-signal transmission timing adjustment values are received (Step 602; Yes), then it is determined whether or not a transmission timing adjustment value TA1 for the cell 1 of the cell group 1 is received (Step 603) and, when it is not received (Step 603; No), the synchronization timer 207 is stopped to stop transmission of uplink signals (Step 609). Here, "stop" transmission corresponds, but is not limited, to not transmitting an uplink signal planned to be transmitted, not transmitting any uplink signal except a specific signal (for example, a signal transmitted by using a common radio resource shared among radio terminals, such as a random access preamble) even if instructions to transmit an uplink signal are received from the radio base station, or the like.

If a transmission timing adjustment value TA1 for the cell 1 of the cell group 1 is received (Step 603; Yes), then transmission timing on the cell 1 is updated (Step 604), and the synchronization timer 207 is restarted (Step 605).

Next, it is determined whether or not a transmission timing adjustment value TA2 for the cell 2 of the cell group 2 is received (Step 606), and when it is received (Step 606; Yes), transmission timing on the cell 2 is updated (Step 607). When a transmission timing adjustment value for the cell 2 of the cell group 2 is not received (Step 606; No), uplink-signal transmission on the cell 2 of the cell group 2 is stopped (Step 608).

Note that when instructions for resynchronization are received from the radio base station after uplink-signal transmission is stopped on the cell 1 of the cell group 1 and on the cell 2 of the cell group 2 or only on the cell 2 of the cell group 2, the radio terminal performs processing for resynchronization in accordance with the instructions. Conceivable processing for resynchronization is, for example, resynchronization processing using random access in which transmission is possible while synchronization remains lost.

Moreover, although the above-described example assumes a case where uplink signals are transmitted by always using the cell 1 of the cell group 1 and the cell 2 of the cell group 2 at the same time, these cells are not necessarily always used at the same time. For example, in a case where transmission is performed by using any one of the cell 1 of the cell group 1 and the cell 2 of the cell group 2, the radio base station calculates a transmission timing adjustment value for the cell of each cell group at some timing such as each time an uplink signal is received, at predetermined intervals, or when a predetermined trigger is detected, and retains such transmission timing adjustment values. At certain time, when it is determined that readjustment (updating) of transmission timing is required for the cell of a cell group on which an uplink signal is received, a transmission timing adjustment value that is calculated for the cell of this cell group and the transmission timing adjustment value that has been calculated and retained for the cell of the other group are notified to the radio terminal.

For example, at certain time, an uplink signal is received on the cell 1 of the cell group 1, and it is determined that readjustment (updating) is required for the cell 1 of the cell group 1, in which case a transmission timing adjustment value that is calculated for the cell 1 of the cell group 1 and the latest transmission timing adjustment value that has been calculated and retained for the cell 2 of the cell group 2 on which an uplink signal is not received at this time are notified together to the radio terminal. For another method, "0" as a "dummy transmission adjustment value," that is, information indicating no change in transmission timing may be notified with respect to the cell of a cell group on which no uplink signal is received.

Note that the above-described example, needless to say, can be applied to cases where there are three or more cell groups on each of which uplink single transmission timing control is performed independently.

4.2) Effects

According to the transmission timing control of the second example of the present invention, in addition to the effects of the basic operations described above, it is possible to easily perform uplink signal synchronization management on cells of all groups based on only one synchronization timer even if, for example, uplink signals are transmitted respectively in a plurality of cell groups for each of which independent uplink-signal transmission timing control is required. Moreover, even in a situation where the synchronization timer is running but an uplink signal on a cell of a cell group with which control of the synchronization timer is not linked is out of (loses) synchronization, the radio terminal can detect such a situation and can avoid an interference to an uplink signal of another radio terminal by autonomously stopping uplink-signal transmission on the cell of the cell group in question.

5. Application Example

As a concrete application example of the present invention, a radio communications system in conformity with 3GPP LTE (Long Term Evolution) will be described in detail. As described already, in LTE, carrier aggregation (CA) is defined in which a radio terminal (User Equipment: UE) transmits and receives user data or upper layer control information by simultaneously using a plurality of component carriers (CC) that correspond to a plurality of cells respectively. The present invention can be applied to such carrier aggregation CA in LTE.

In the functionality of the carrier aggregation CA, a cell used by a radio terminal UE to obtain system information and security information that are most fundamental in communication with a radio base station eNB is referred to as primary cell (PCell), and other cells which are used simultaneously with the primary cell PCell are referred to as secondary cell (SCell). That is, the radio terminal UE can transmit and receive user data and the like by using the single primary cell PCell and one or more secondary cells SCell at the same time.

Note that in preparation for performing downlink carrier aggregation CA, the radio base station eNB first configures secondary cells SCell (configure SCell) for the radio terminal UE. In this event, minimum components required to configure secondary cells are information about component carriers CC corresponding to downlink radio resources. Then, a secondary cell to be actually used is selected among the configured secondary cells (configured SCell), and instructions are made to the radio terminal UE to activate this secondary cell (activation of SCell). Thereafter, the radio terminal UE can receive downlink signals by using the actually activated secondary cell (activated SCell) and the primary cell PCell at the same time.

On the other hand, in preparation for performing uplink carrier aggregation CA, the radio base station eNB notifies, in addition to information about a downlink component carrier CC, information about a component carrier CC corresponding to a relevant uplink radio resource when a secondary cell is configured for the radio terminal UE. Then, after this secondary cell is activated (activation of SCell with configured uplink), the uplink component carrier CC (uplink radio resource) of this secondary cell SCell can be used.

Here, a set of cells that respectively correspond to a plurality of uplink radio resources (component carriers CC) to which the same transmission timing adjustment value (Timing Advance: TA) can be applied (used or shared) is referred to as synchronization group (Timing Advance Group: TA Group). The synchronization group (TA Group) corresponds to the above-described cell group. However, each synchronization group (TA Group) includes one or more cells. That is, each synchronization group (TA Group)

may be configured with only one cell. Moreover, a synchronization group (TA Group) that includes the primary cell PCell is referred to as primary synchronization group (Primary TA Group or PCell TA Group), and a synchronization group (TA Group) that includes only secondary cells SCell is referred to as secondary synchronization group (Secondary TA Group or SCell TA Group). The primary synchronization group includes only the primary cell PCell or includes the primary cell PCell and one or more secondary cells SCell, and the secondary synchronization group includes one or more secondary cells SCell. Note that the primary synchronization group and the secondary synchronization group correspond to the cell groups 1 and 2 described above, respectively.

According to the present embodiment, when the radio terminal UE performs carrier aggregation CA, the radio base station eNB calculates a transmission timing adjustment value TA for each synchronization group to which a cell activated for the radio terminal UE belongs, and transmits the transmission timing adjustment values TA for all the synchronization groups at a time. Note that the present invention is assumed to be applied to control after uplink synchronization is once established, not applied to the initial establishment of uplink synchronization. For example, when uplink synchronization is established for the first time in a state where uplink synchronization is not established, a transmission timing adjustment value is independently transmitted for each synchronization group in response to a random access. However, the present invention is not limited to this.

Figure 14:
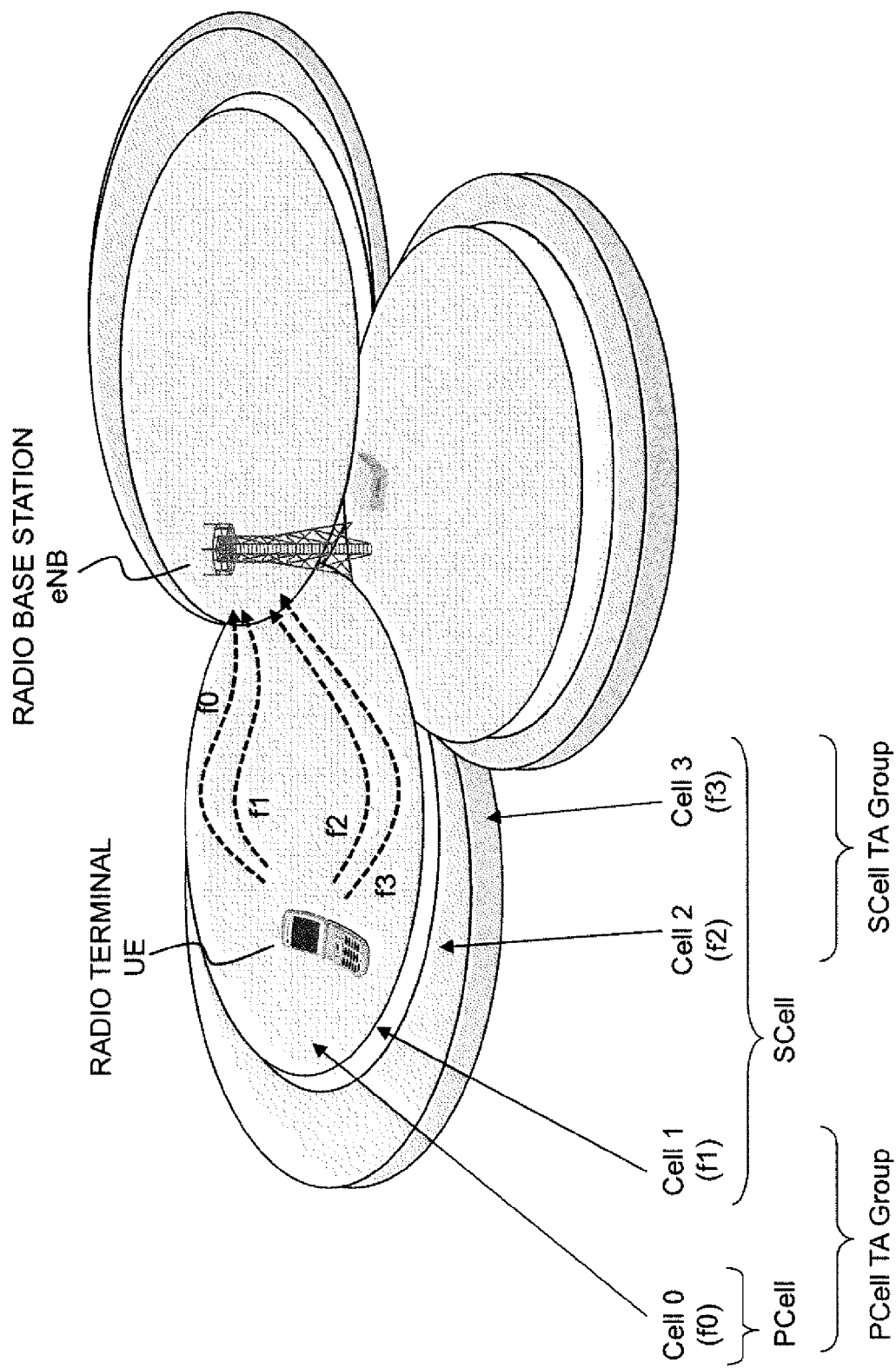
FIG. 14 is a schematic diagram showing an example of synchronization groups for describing carrier aggregation in a radio communications system that is a concrete application example of the present exemplary embodiment.

Referring to FIG. 14, the radio base station eNB manages cells by using four frequency bands f0, f1, f2, and f3, and the radio terminal UE can transmit uplink signals by using, at the same time, all or some of an uplink radio resource on a cell 0 of the frequency band f0 (hereinafter, simply referred to as cell 0), an uplink radio resource on a cell 1 of f1 (hereinafter, simply referred to as cell 1), an uplink radio resource on a cell 2 of f2 (hereinafter, simply referred to as cell 2), and an uplink radio resource on a cell 3 of f3 (hereinafter, simply referred to as cell 3). Here, it is assumed that the cell 0 is a primary cell PCell, and the cells 1 to 3 are secondary cells SCell. Moreover, it is assumed that the cells 0 and 1 that have the same propagation delays (propagation characteristics) comprise a primary synchronization group, and the cells 2 and 3 that similarly have the same propagation delays (propagation characteristics) comprise a secondary synchronization group.

In examples to be described below, an uplink signal from the cell 0, which is the primary cell PCell of the primary synchronization group, or from the cell 1, which is the secondary cell SCell thereof, will simply be referred to as "uplink signal from the primary synchronization group," and an uplink signal from the cell 2 or the cell 3, which are the secondary cells SCell of the secondary synchronization group, will simply be referred to as "uplink signal from the secondary synchronization group." Moreover, unless otherwise explained, uplink signals on the cells 0 and 1 will not be differentiated from each other. Similarly, uplink signals on the cells 2 and 3 will not be differentiated from each other.

3. Third Example

Next, a method for uplink-signal transmission timing control according to a third example of the present invention will be described by taking as an example carrier aggregation CA in the system shown in FIG. 14.

According to the third example, the radio base station eNB transmits uplink-signal transmission timing adjustment values TA for both the primary synchronization group and the secondary synchronization group to the radio terminal UE at a time. The radio terminal UE causes a synchronization timer TAT for determining uplink signal synchronization to operate linked with transmission timing control on the primary synchronization group. That is, the synchronization timer TAT is restarted each time an uplink-signal transmission timing adjustment value TA to be set on a cell of the primary synchronization group is received. Similarly, the radio base station eNB restarts its synchronization timer TAT each time it transmits an uplink-signal transmission timing adjustment value TA to be set on a cell of the primary synchronization group.

Here, the reason for linking the synchronization timer TAT with transmission timing control on the primary synchronization group is that in LTE, a physical channel (Physical Uplink Control Channel: PUCCH) that transmits uplink control signals concerning the Physical Layer and the MAC Layer (Medium Access Control Layer) can be used only on the primary cell, and therefore uplink signal synchronization on the primary cell is most important. However, a target to be linked with the single shared synchronization timer TAT is preferably, but is not limited to, the primary synchronization group, but may be a secondary synchronization group. Moreover, in LTE, information indicating transmission timing adjustment values TA is referred to as TA command (Timing Advance Command) and is transmitted as control information (Control Element: CE) on the MAC layer. Hereinafter, the third example of the present invention will be described in more detail with reference to FIGS. 15 and 16.

Figure 15:
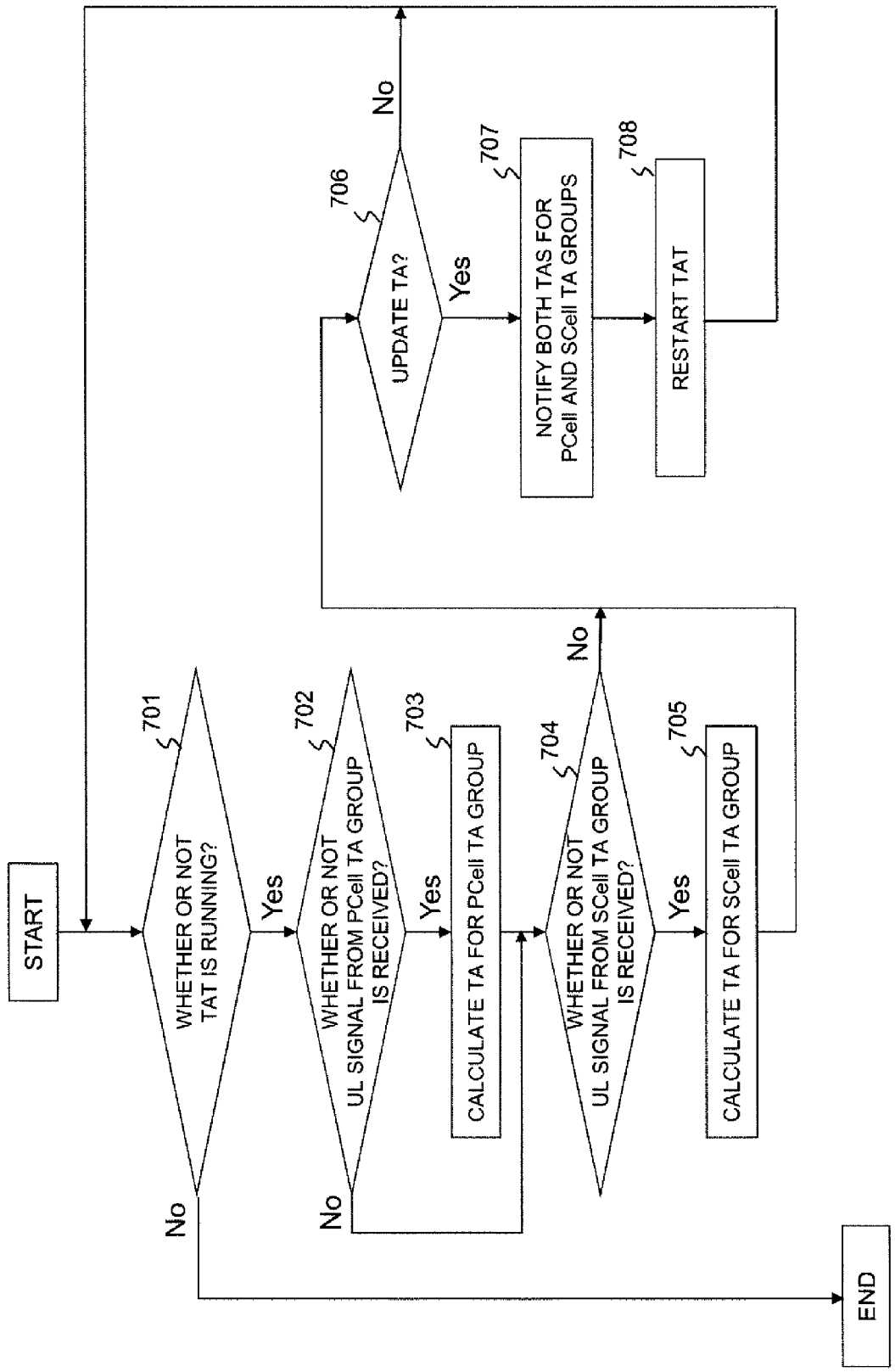
FIG. 15 is a flowchart showing a control operation of a radio base station in a method for transmission timing control according to a third example of the present invention.

Referring to FIG. 15, at the radio base station eNB, when the synchronization timer TAT is running for a radio terminal UE which is a target of uplink transmission timing control (Step 701; Yes), it is determined whether or not an uplink signal from the primary synchronization group is received (Step 702). When it is received (Step 702; Yes), a transmission timing adjustment value TA for the primary synchronization group is calculated and a result of calculation is retained (Step 703). Step 703 is not performed when no such uplink signal is received (Step 702; No).

Next, it is determined whether or not an uplink signal from the secondary synchronization group is received (Step 704), and when it is received (Step 704; Yes), a transmission timing adjustment value TA for the secondary synchronization group is calculated and a result of calculation is retained (Step 705). Step 705 is not performed when no such uplink signal is received (Step 704; No). Subsequently, it is determined whether or not updating of transmission timing adjustment values TA is required (Step 706). When updating is required (Step 706; Yes), the transmission timing adjustment values TA for both the primary synchronization group and the secondary synchronization group are notified together to the radio terminal UE (Step 707), the synchronization timer TAT is restarted (Step 708), and the process goes back to Step 701. When updating of transmission timing adjustment values TA is not required (Step 706; No), the process goes back to Step 701, without Steps 707 and 708 being performed.

Figure 16:
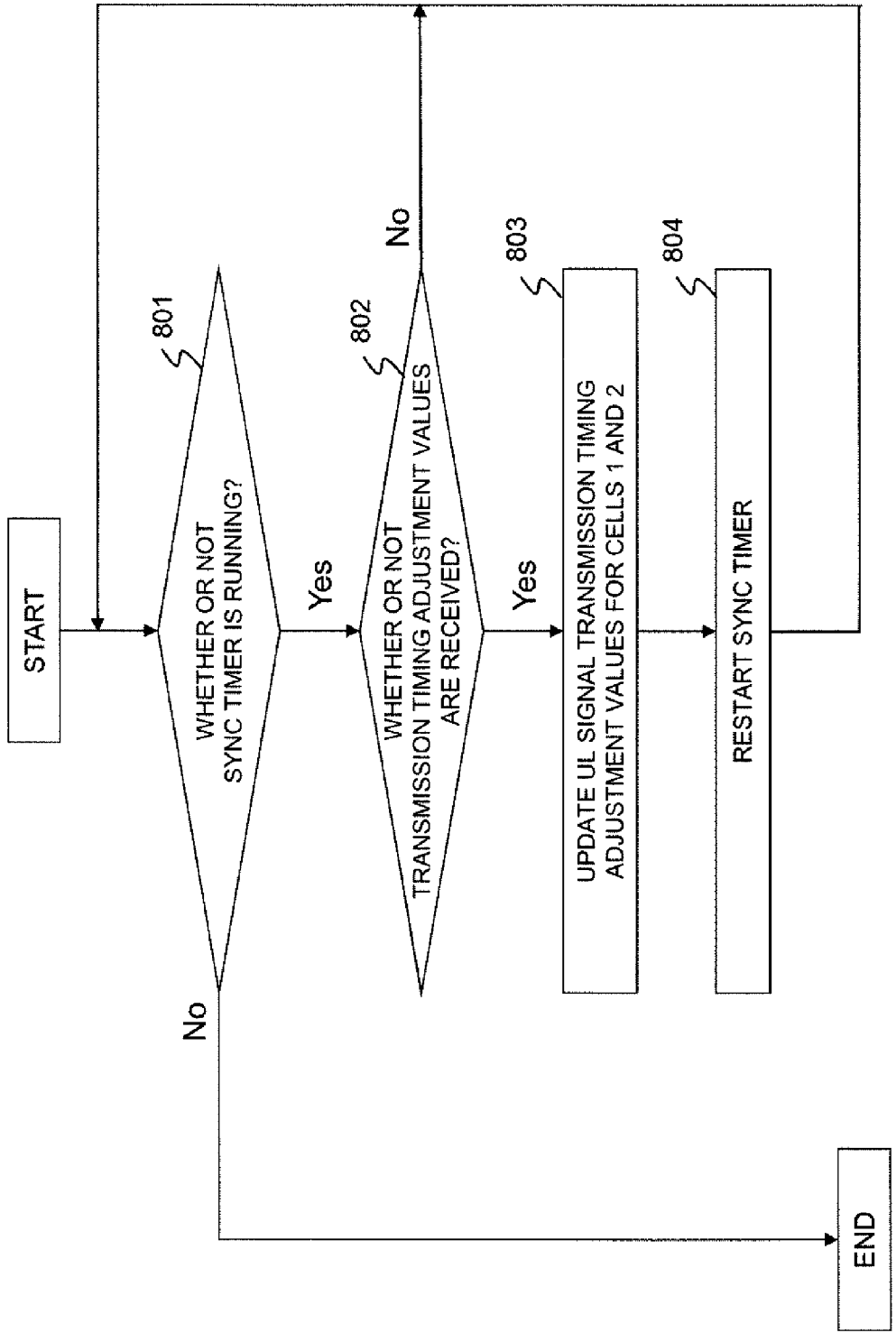
FIG. 16 is a flowchart showing a control operation of a radio terminal in the method for transmission timing control according to the third example of the present invention.

Referring to FIG. 16, at the radio terminal UE, when the synchronization timer TAT is running (Step 801; Yes), it is determined whether or not a TA command including information about uplink-signal transmission timing adjustment values TA is received (Step 802). When a TA command is received (Step 802; Yes), transmission timing in each of the primacy synchronization group and the secondary synchronization group is updated (Step 803), the synchronization timer TAT is restarted (Step 804), and the process goes back to Step 801. When no TA command is received (Step 802; No), the process goes back to Step 801, without Steps 803 and 804 being performed. If the synchronization timer is not running (Step 801; No), the processing is finished immediately.

According to the above-described third example of the present invention, in addition to the effects of the basic operations described above, it is possible to easily implement transmission timing control on a plurality of cells (a plurality of synchronization groups) in which uplink-signal transmission timing is independent of each other, only by using one synchronization timer TAT, without using a plurality of synchronization timers TAT.

Figure 21B:
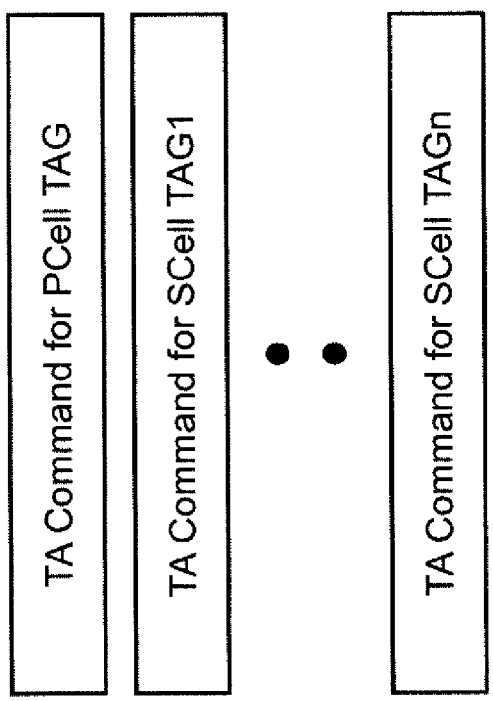
FIG. 21B is a schematic diagram showing another example of messages transmitting uplink transmission timing adjustment values.
Figure 21A:
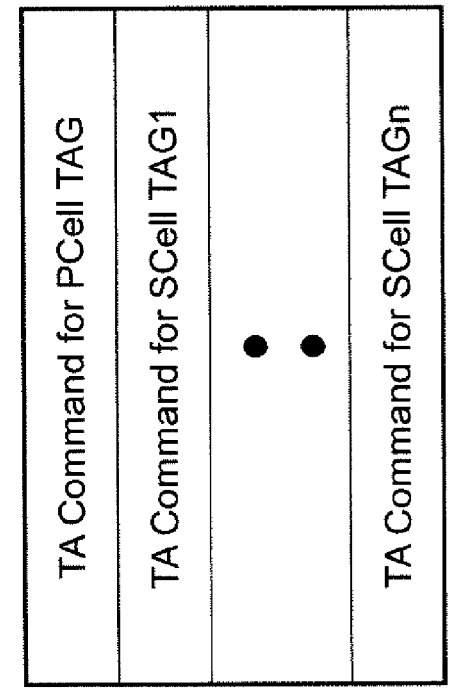
FIG. 21A is a schematic diagram showing an example of a message transmitting uplink transmission timing adjustment values.

Note that the radio base station eNB notifies transmission timing adjustment values TA for the primary synchronization group and the secondary synchronization group together to the radio terminal UE, and conceivable methods for notification include, for example, a method in which they are collectively notified in a single message (TA Command MAC CE) as shown in FIG. 21A, a method in which a TA for each synchronization group is notified on an arbitrary cell of its corresponding synchronization group at the same time (in the same sub-frames) as shown in FIG. 21B, and the like.

7. Fourth Example

Next, a method for uplink-signal transmission timing control according to a fourth example of the present invention will be described by taking as an example carrier aggregation CA in the system shown in FIG. 14.

In the fourth example, the radio base station eNB normally transmits uplink-signal transmission timing adjustment values TA for both the primary synchronization group and the secondary synchronization group to the radio terminal UE at a time. However, at certain time, when it is detected that an uplink signal of either the primary synchronization group or the secondary synchronization group is out of synchronization (loses synchronization), the radio base station eNB transmits only a transmission timing adjustment value TA for the synchronization group excluding such a synchronization group to the radio terminal UE.

On the other hand, when the radio terminal UE detects that there is a synchronization group for which a transmission timing adjustment value TA to be received is not received, the radio terminal UE stops transmission of uplink signals on the cells of such a synchronization group. Note that when a loss of synchronization in the primary synchronization group including the primary cell PCell is detected, the radio base station eNB stops (does not perform) transmission of a TA command itself including information about transmission timing adjustment values TA. Similarly, when the radio terminal UE receives a TA command which, however, does not include a transmission timing adjustment value TA for the primary synchronization group, the radio terminal UE determines an error case and stops (does not perform) transmission of all uplink signals. Hereinafter, the fourth example of the present invention will be described in more detail with reference to FIGS. 17 and 18.

Figure 17:
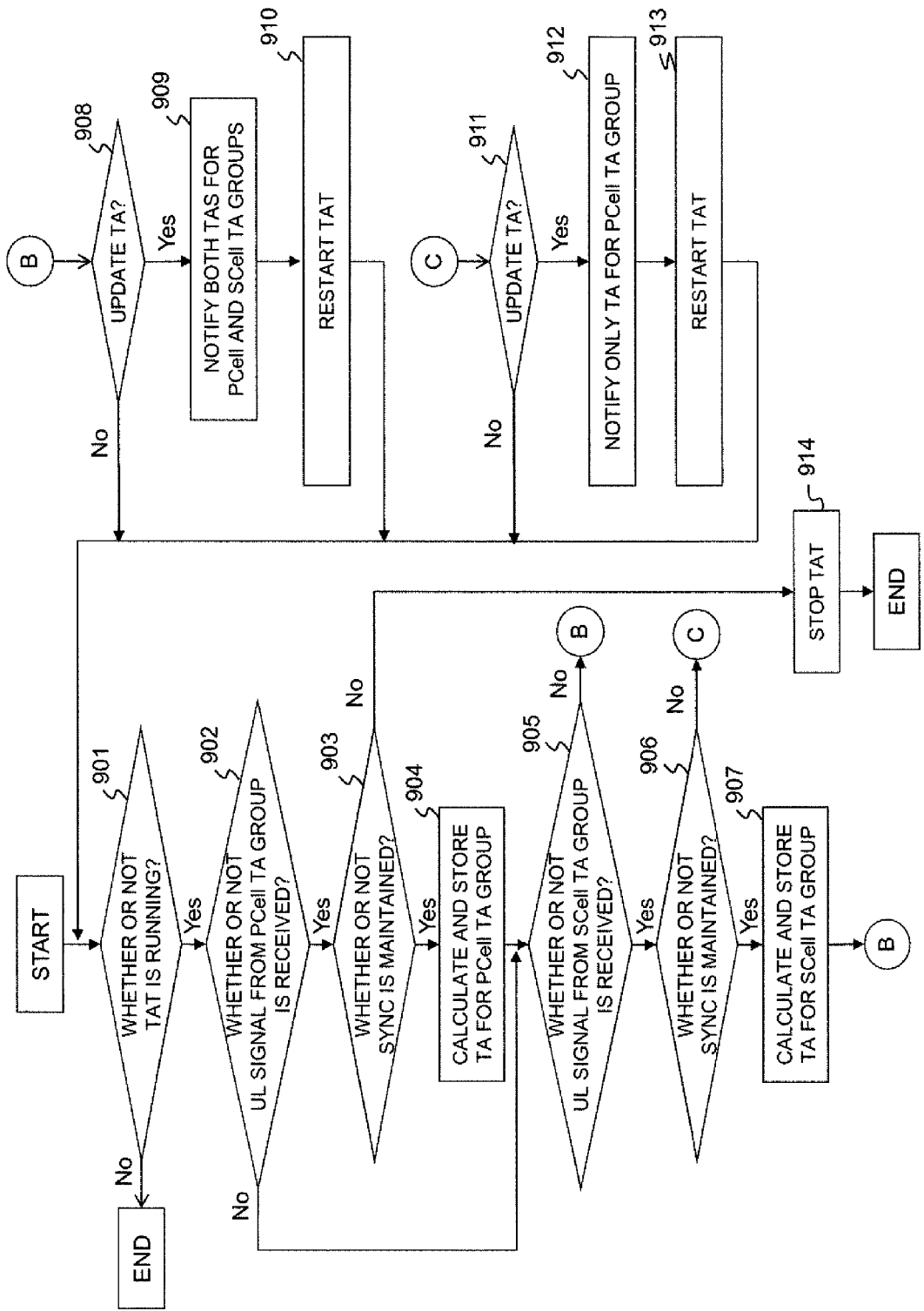
FIG. 17 is a flowchart showing a control operation of the radio base station in a method for transmission timing control according to a fourth example of the present invention.

Referring to FIG. 17, at the radio base station eNB, when the synchronization timer is running (Step 901; Yes), it is determined whether or not an uplink signal from the primary synchronization group is received (Step 902). When it is received (Step 902; Yes), it is determined whether or not this uplink signal from the primary synchronization group is still in synchronization (Step 903), and when it is in synchronization (Step 903; Yes), a transmission timing adjustment value TA for the primary synchronization group is calculated and a result of calculation is retained (Step 904). If no uplink signal from the primary synchronization group is received (Step 902; No), Steps 903 and 904 are not performed.

Subsequently, when an uplink signal from the secondary synchronization group is received (Step 905; Yes), it is determined whether or not this uplink signal from the secondary synchronization group is still in synchronization (Step 906). When it is in synchronization (Step 906; Yes), a transmission timing adjustment value TA for the secondary synchronization group is calculated and a result of calculation is retained (Step 907). If no uplink signal from the secondary synchronization group is received (Step 905; No), Steps 906 and 907 are not performed.

When both the uplink signals of the primary synchronization group and the secondary synchronization group are in synchronization, it is determined whether or not to update transmission timing adjustment values TA (Step 908), and when it is determined to update (Step 908; Yes), the transmission timing adjustment values TA for both the synchronization groups are notified together to the radio terminal UE (Step 909). Then, the synchronization timer TAT is restarted (Step 910), and the process goes back to Step 701. When it is determined not to update transmission timing adjustment values TA (Step 908; No), the process goes back to Step 901, without Steps 909 and 910 being performed.

When only the uplink signal of the primary synchronization group is in synchronization (Step 906; No), it is determined whether or not to update a transmission timing adjustment value TA only for the primary synchronization group (Step 911). When it is determined to update (Step 911; Yes), a transmission timing adjustment value for the primary synchronization group is notified to the radio terminal UE (Step 912), the synchronization timer TAT is restarted (Step 913), and the process goes back to Step 901. When it is determined not to update a transmission timing adjustment value TA (Step 911; No), the process goes back to Step 901, without Steps 912 and 913 being performed. However, thereafter, processing with respect to the secondary synchronization group may basically be skipped until an uplink signal of the secondary synchronization group is resynchronized.

When the uplink signal of the primary synchronization group is out of synchronization (loses synchronization) (Step 903; No), the synchronization timer TAT is stopped (Step 914), and transmission timing control is finished. Thereafter, the radio terminal UE is caused to perform processing for uplink signal resynchronization in the primary synchronization group as necessary.

Figure 18:
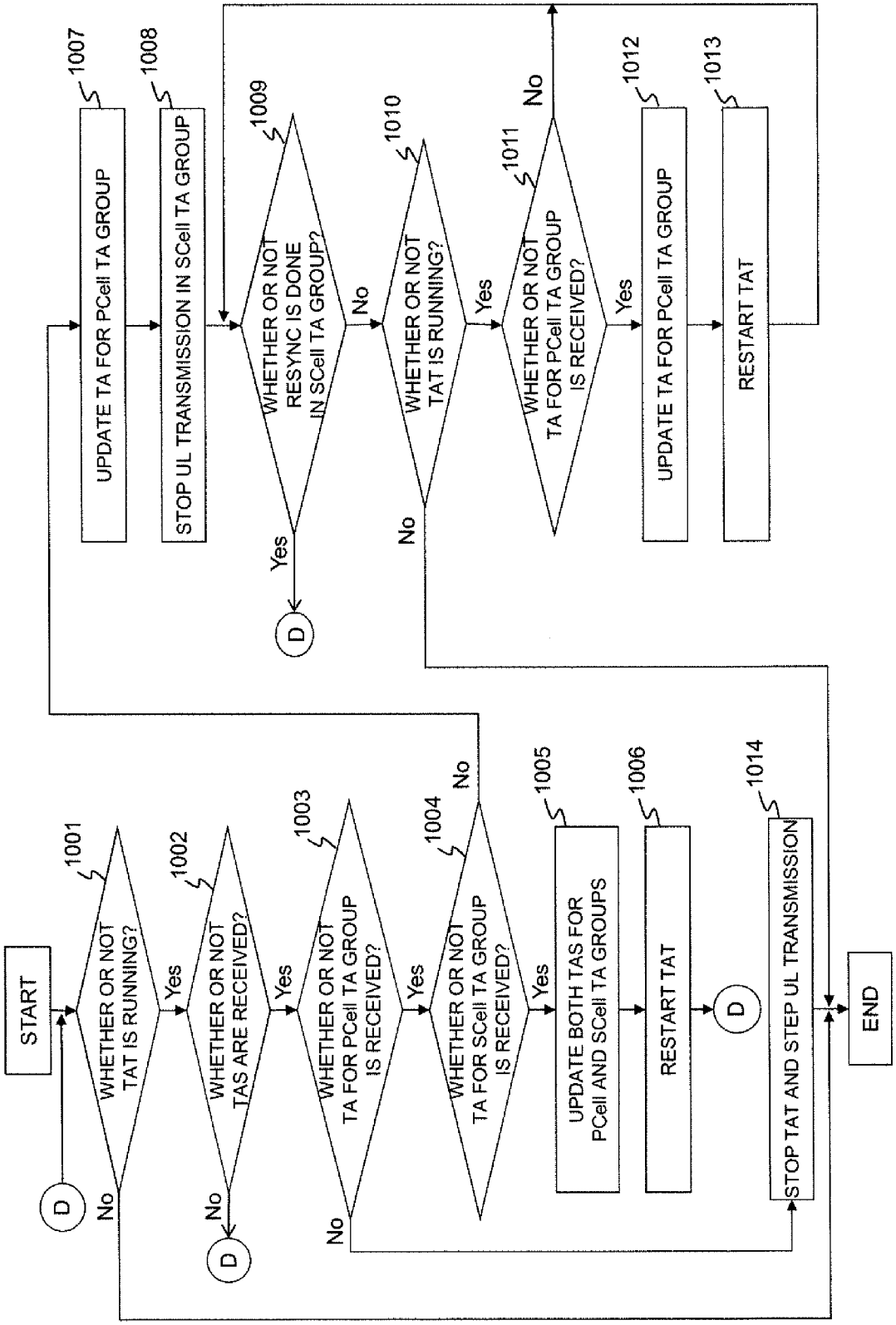
FIG. 18 is a flowchart showing a control operation of the radio terminal in the method for transmission timing control according to the fourth example of the present invention.

Referring to FIG. 18, at the radio terminal UE, when the synchronization timer TAT is running (Step 1001; Yes), it is determined whether or not a TA command including information about uplink-signal transmission timing adjustment values TA is received (Step 1002). When a TA command is received (Step 1002; Yes), it is first determined whether or not a transmission timing adjustment value TA for the primary synchronization group is included (Step 1003). When a transmission timing adjustment value TA for the primary synchronization group is included (Step 1003; Yes), it is determined whether or not a transmission timing adjustment value TA for the secondary synchronization group is also included (Step 1004).

When a transmission timing adjustment value TA for the secondary synchronization group is also included (Step 1004; Yes), transmission timings in both the synchronization groups are updated (Step 1005), the synchronization timer TAT is restarted (Step 1006), and the process goes back to Step 1001.

On the other hand, when a transmission timing adjustment value TA for the secondary synchronization group is not included (Step 1004; No), transmission timing in the primary synchronization group is updated (Step 1007), and uplink-signal transmission in the secondary synchronization group is stopped (is not performed) (Step 1008).

Subsequently, it is determined whether or not an uplink signal of the secondary synchronization group is resynchronized (Step 1009), and when the secondary synchronization group is resynchronized (Step 1009; Yes), the process goes back to Step 1001. When it is not resynchronized (Step 1009; No), a similar procedure is repeated only with respect to the primary synchronization group. That is, it is first determined whether or not the synchronization timer TAT is running (Step 1010), and when it is running (Step 1010; Yes), it is determined whether or not a TA command is received (Step 1011). When a TA command is received (Step 1011; Yes), transmission timing is updated for the primary synchronization group (Step 1012), the synchronization timer TAT is restarted (Step 1013), and the process goes back to Step 1009. When no TA command is received (Step 1011; No), the process goes back to Step 1009, without Steps 1012 and 1013 being performed.

When a TA command is received but does not include an uplink-signal transmission timing adjustment value TA for the primary synchronization group (Step 1003; No), the synchronization timer TAT is stopped and transmission of all uplink signals is stopped (is not performed) (Step 1014). Thereafter, the radio terminal UE is caused to perform processing for uplink signal resynchronization in the primary synchronization group as necessary.

As described above, according to the fourth example of the present invention, it is possible to easily implement transmission timing control on a plurality of cells (a plurality of synchronization groups) on which uplink-signal transmission timing is independent of each other, only by using one synchronization timer TAT. In addition, even in an error case where an uplink signal on a cell of a certain synchronization group is out of synchronization even though the synchronization timer TAT is running, the radio terminal UE can immediately detect a loss of synchronization and can avoid interference to an uplink signal of another radio terminal UE.

Note that the radio base station eNB notifies transmission timing adjustment values TA for the primary synchronization group and the secondary synchronization group to the radio terminal UE at a time, and conceivable methods for notification include, for example, a method in which they are collectively notified in a single message (TA Command MAC CE) as shown in FIG. 21A, a method in which a TA for each synchronization group is notified on an arbitrary cell of its corresponding synchronization group at the same time (in the same sub-frames) as shown in FIG. 21B, and the like.

8. Fifth Example

A fifth example of the present invention is premised on the above-described transmission timing control according to the fourth example shown in FIGS. 17 and 18. As discussed in the above-described fourth example, in a case where an uplink signal on a cell of the primary synchronization group is in synchronization but an uplink signal on a cell of the secondary synchronization group is out of synchronization (loses synchronization), resynchronization (reestablishment of synchronization) in the secondary synchronization group is performed when the radio terminal UE detects a loss of synchronization (Step 1004; No). Hereinafter, a procedure for resynchronization in the secondary synchronization group will be described with reference to FIG. 19.

8.1) Resynchronization Control

Referring to FIG. 19, at the radio terminal UE, from the fact that a received TA command does not include a transmission timing adjustment value TA for a secondary synchronization group that has been used for uplink-signal transmission in carrier aggregation CA, it is detected that an uplink signal is out of synchronization in this secondary synchronization group (Step 1101). Then, it is determined whether or not resynchronization (reestablishment of synchronization) is (has been) triggered (Step 1102), and when it is determined that resynchronization is (has been) triggered (Step 1102; Yes), random access is performed (Step 1103). When random access is successfully done (Step 1104; Yes), it is regarded as the reestablishment of uplink signal synchronization in the secondary synchronization group, and uplink-signal transmission is restarted as necessary (Step 1105). Note that a conceivable trigger for resynchronization is a detection of the fact that a transmission timing adjustment value for the secondary synchronization group is not included (that is, an autonomous one by the radio terminal UE), instructions for resynchronization from the radio base station eNB, or the like. Conceivable instructions for resynchronization from the radio base station eNB include a message indicating instructions to execute resynchronization, instructions to execute a random access scheme, and the like. The random access scheme is a contention based scheme in which there is a possibility that a plurality of radio terminals UE compete for a random access preamble, or a non-contention based scheme in which a preamble dedicated to a radio terminal (UE) is assigned.

According to the above-described resynchronization control, it is possible to immediately accomplish resynchronization when the radio terminal UE detects a loss of uplink signal synchronization in the secondary synchronization group. Note that although shown here is a loss of uplink signal synchronization in the secondary synchronization group as an example, resynchronization can also be accomplished through basically the same control in case of the primary synchronization group.

8.2) Transmission Timing Control

Referring to FIG. 20, it is assumed that the radio terminal UE has already performed carrier aggregation CA and is performing uplink-signal transmission by using cells that belong to the primary synchronization group and the secondary synchronization group respectively.

At certain time, the radio terminal UE restarts the synchronization timer TAT (Step S1201), and uplink signals are basically in an in-synchronization state (In-sync) while the synchronization timer TAT is running.

The radio base station eNB, which notifies transmission timing adjustment values TA to the radio terminal UE as necessary, transmits transmission timing adjustment values TA for all synchronization groups at a time as long as an uplink signal from a cell of each synchronization group is in synchronization as described already. In FIG. 20, transmission timing adjustment values TA for both the primary synchronization group and the secondary synchronization group (PCell and SCell TA Grp) are transmitted.

When the synchronization timer TAT is not updated and expires (Step S1203) for the reason that the transmission timing adjustment values TA are not successfully received (Step S1202), that synchronization is no longer required, or the like, the radio terminal UE falls in an out-of-synchronization state (Out-of-sync) and stops (does not perform) uplink-signal transmission (Step S1204).

Normally, an in-synchronization state is determined while the synchronization timer TAT is running, but in an error case, there is a possibility that an actual in-synchronization state is not guaranteed. Here, it is assumed that an uplink signal of the secondary synchronization group loses synchronization while the synchronization timer TAT is running (Step S1205), and that the radio base station eNB that receives an uplink signal from a cell of the secondary synchronization group detects this loss of synchronization (Step S1206). In this case, the radio base station eNB notifies only a transmission timing adjustment value TA for the primary synchronization group to the radio terminal UE (Step S1207).

The radio terminal UE receives this transmission timing adjustment value TA and restarts the synchronization timer TAT. However, since a transmission timing adjustment value TA for the secondary synchronization group is not received, the radio terminal UE stops (does not perform) uplink-signal transmission on the cells of the secondary synchronization group (Step S1208). Uplink-signal transmission on the cells of the primary synchronization group is possible (Step S1209). Thereafter, when it is determined that uplink signal resynchronization is required on a cell of the secondary synchronization group, the radio base station eNB makes a request for resynchronization (UL re-sync request) to the radio terminal UE (Step S1201). For this request for resynchronization, conceivable one is instructions to perform non-contention based or contention based random access, a message simply instructing to execute resynchronization, or the like. The radio terminal UE, upon receiving the instructions for resynchronization, carries out an operation for resynchronization in accordance with the instructions (Step S1211). Then, when resynchronization is completed, the radio terminal UE restarts uplink-signal transmission in accordance with instructions from the radio base station eNB (Step S1212). Note that a request or instructions for resynchronization are not necessarily required, but the radio terminal UE may autonomously perform the operation for resynchronization after it detects that a transmission timing adjustment value TA for the secondary synchronization group is not included.

9. Other Examples

In the hitherto-described examples, the physical channel (PUCCH) transmitting uplink control signals concerning the Physical Layer and the MAC Layer can basically be used only on a primary cell. However, the present invention can also be applied in a case where the physical channel (PUCCH) transmitting uplink control signals can also be used on a secondary cell. For example, in a case where the physical channel (PUCCH) can be used on at least one cell of each synchronization group, uplink-signal transmission can be continued regardless of uplink signal synchronization on the primary cell, as long as uplink signal synchronization is maintained on the cell of each synchronization group.

Moreover, conceivable methods for configuring a synchronization group (TA Group) are as follows.

First, for carrier aggregation (CA) in LTE, serving cell indexes (ServCellIndex) are defined to correspond to individual cells. For example, a serving cell index "0" is assigned to a primary cell (PCell), and serving cell indexes "1 to 7" are respectively assigned to secondary cells (SCell). Further, secondary cell indexes (SCellIndex) are also defined. Secondary indexes "1 to 7" correspond to the serving cell indexes "1 to 7" respectively. Since a primary cell always has the serving cell index "0," a radio base station (eNB) does not particularly notify a radio terminal (UE) of information about the serving cell index of the primary cell. However, each secondary cell index is notified from a radio base station (eNB) to a radio terminal (UE) when a secondary cell is configured (configure SCell).

Here, for a method for configuring a synchronization group (TA Group), when secondary cells are configured, that is, when secondary cell indexes are notified, a synchronization group index (number) (TA Group Index or TA Group ID) may be notified from a radio base station (eNB) to a radio terminal (UE), or information about a synchronization group index and corresponding cells or frequencies may be broadcast or individually notified to radio terminals (UEs) in the cells. Note that a synchronization group index may be notified only when configuration of an uplink radio resource (component carrier CC) corresponding to a secondary cell of interest is involved. Moreover, it is conceivable that a synchronization group index of a primary synchronization group (PCell TA Group) including a primary cell is set for "0" and synchronization group indexes of secondary synchronization groups (SCell TA Groups) are set for consecutive numbers starting from "1," but the present invention is not limited to this.

Furthermore, in the hitherto-discussed examples, a description has been given with 3GPP LTE in mind for the radio communications systems. However, the targets of the present invention are not limited to these but can be applied to GSM (Global System for Mobile communications), UMTS (Universal Mobile Telecommunications System), WiMAX (Worldwide interoperability for Microwave Access), and the like.

INDUSTRIAL APPLICABILITY

The present invention is applicable to transmission timing control in radio communications systems such 3GPP LTE, GSM, UMTS, and the like.

REFERENCE SIGNS LIST

10 Radio base station
101 Reception section
102 Demodulation section
103 Upper layer
104 Timing control unit (UEx)
105 Transmission signal generation section
106 Transmission section
107 Synchronization timer (TAT)
108 PCell-TA calculation and retention section
109 SCell-TA calculation and retention section
20 Radio terminal
201 Reception section
202 Demodulation section
203 Upper layer
204 Timing control unit
205 Transmission signal generation section
206 Transmission section
207 Synchronization timer (TAT)

208 PCell-TA management section
209 SCell-TA management section

The invention claimed is:

1. A radio station configured to communicate with a radio terminal by using a plurality of radio resources that correspond respectively to a plurality of cells, wherein the plurality of cells includes a first cell and a second cell and are associated with a plurality of cell groups, comprising:
a memory device that stores a set of instructions; and
at least one processor configured to execute the set of instructions to:
calculate at least one of a first uplink-signal transmission timing adjustment value for the first cell and a second uplink-signal transmission timing adjustment value for the second cell;
determine whether at least one of the first and second cells is in uplink-signal synchronization with the radio station;
responsive to determining that the first cell is in uplink-signal synchronization with the radio station and that the second cell is not in uplink-signal synchronization with the radio station, transmit the first uplink-signal transmission timing adjustment value to the radio terminal, wherein the second up-signal transmission timing adjustment value is excluded from the transmission.

2. The radio station according to claim 1, wherein each of the plurality of cell groups comprises cells to which a same uplink-signal transmission timing adjustment value is applied.

3. The radio station according to claim 1, wherein the plurality of cell groups include a first cell group including at least a specific cell, and at least one second cell group including only cells other than the specific cell.

4. The radio station according to claim 3, further comprising a synchronization timer configured to provide data for determining uplink-signal synchronization in the plurality of cell groups, wherein the synchronization timer is configured to provide data for uplink-signal transmission timing control on the first cell group.

5. The radio station according to claim 4, wherein when the first cell group loses uplink-signal synchronization, the at least one processor is further configured to execute the set of instructions to stop the synchronization timer and to cause the radio terminal to stop uplink-signal transmission.

6. The radio station according to claim 1, wherein the at least one processor is configured to execute the set of instructions to start, with the radio terminal, a procedure to establish uplink-signal synchronization on a cell that is not in uplink-signal synchronization.

7. A method for transmission timing control at a radio station configured to communicate with a radio terminal by using a plurality of radio resources that correspond respectively to a plurality of cells, wherein the plurality of cells includes a first cell and a second cell and are associated with a plurality of cell groups, comprising:
calculating at least one of a first uplink-signal transmission timing adjustment value for the first cell and a second uplink-signal transmission timing adjustment value for the second cell;
determining whether at least one of the first and second cells is in uplink-signal synchronization with the radio station;
responsive to determining that the first cell is in uplink-signal synchronization with the radio station and the second cell is not in uplink-signal synchronization with the radio station, transmitting the first uplink-signal transmission timing adjustment value to the radio terminal, wherein the second uplink-signal transmission timing adjustment value is excluded from the transmission.

8. The method for transmission timing control according to claim 7 wherein each of the plurality of cell groups consists of cells to which a same uplink-signal transmission timing adjustment value is applied.

9. The method for transmission timing control according to claim 8, further comprising starting, with the radio terminal, a procedure to establish uplink-signal synchronization on a cell belonging to the cell group that loses uplink-signal synchronization.

10. The method for transmission timing control according to claim 7, wherein the plurality of cell groups includes a first cell group including at least a specific cell, and at least one second cell group including only cells other than the specific cell.

11. The method for transmission timing control according to claim 10, wherein the radio station comprises a synchronization timer configured to determine uplink-signal synchronization in the plurality of cell groups, wherein the synchronization timer is configured to provide data for uplink-signal transmission timing control on the first cell group.

12. The method for transmission timing control according to claim 11, further comprising, responsive to determining that the first cell group loses uplink-signal synchronization, stopping the synchronization timer is stopped to cause the radio terminal to stop uplink-signal transmission.

13. The method for transmission timing control according to claim 7, further comprising, starting, with the radio terminal, a procedure to establish uplink-signal synchronization on a cell belonging to the cell group that is not in uplink-signal synchronization.

14. A radio terminal configured to communicate with a radio station by using a plurality of radio resources that correspond respectively to a plurality of cells, wherein the plurality of cells includes a first cell and a second cell and are associated with a plurality of cell groups, comprising:
a memory device that stores a set of instructions; and
at least one processor configured to execute the set of instructions to receive uplink-signal transmission timing adjustment values for at least one of the first and second cells from the radio station, wherein the transmission timing adjustment value for the second cell is not received from the radio station based on a determination that the second cell loses uplink-signal synchronization with the radio station.

15. The radio terminal according to claim 14, wherein the at least one processor is configured to execute the set of instructions to determine whether an uplink-signal transmission timing adjustment value is received for each of the plurality of cell groups.

16. The radio terminal according to claim 15, wherein uplink-signal transmission is stopped in a cell group for which an uplink-signal transmission timing adjustment value is not received.

17. The radio terminal according to claim 15, wherein the at least one processor is configured to execute the set of instructions to start a procedure for establishing uplink synchronization with the radio station on a cell that loses uplink-signal synchronization.

18. The radio terminal according to claim 14, wherein the at least one processor is configured to execute the set of instructions to determine for each of the plurality of cell groups whether to enable or to disable uplink-signal transmission, based on whether or not an uplink-signal transmission timing adjustment value is received for each of the plurality of cell groups.

19. The radio terminal according to claim 18, wherein the at least one processor is configured to execute the set of instructions to start a procedure for establishing uplink synchronization in conjunction with the radio station on a cell that loses uplink-signal synchronization.

20. The radio terminal according to claim 14, wherein each of the plurality of cell groups comprises cells to which a same uplink-signal transmission timing adjustment value is applied.

21. The radio terminal according to claim 14, wherein the plurality of cell groups includes a first cell group including at least a specific cell, and at least one second cell group including only cells other than the specific cell.

22. The radio terminal according to claim 21, further comprising a synchronization timer configured to provide data for determining uplink-signal synchronization in the cell groups, wherein the synchronization timer is configured to provide data for uplink-signal transmission timing control on the first cell group.

23. The radio terminal according to claim 22, wherein when the first cell group loses uplink-signal synchronization, the at least one processor is configured to execute the set of instructions to stop the synchronization timer to stop uplink-signal transmission.

24. A method for transmission timing control at a radio terminal configured to communicate with a radio station by using a plurality of radio resources that correspond respectively to a plurality of cells, wherein the plurality of cells includes a first cell and a second cell and are associated with a plurality of cell groups, comprising:
receiving uplink-signal transmission timing adjustment values for at least one of the first and second cells from the radio station, wherein the transmission timing adjustment value for the second cell is not received from the radio station based on a determination that the second cell loses uplink-signal synchronization with the radio station.

25. The method for transmission timing control according to claim 24, further comprising determining whether an uplink-signal transmission timing adjustment value is received for each of the plurality of cell groups.

26. The method for transmission timing control according to claim 25, wherein uplink-signal transmission is stopped in a cell group for which an uplink-signal transmission timing adjustment value is not received.

27. The method for transmission timing control according to claim 25, further comprising: starting a procedure for establishing uplink synchronization in conjunction with the radio station on a cell that loses uplink-signal synchronization.

28. The method for transmission timing control according to claim 24, further comprising determining for each of the plurality of cell groups whether to enable or to disable uplink-signal transmission, based on whether or not an uplink-signal transmission timing adjustment value is received for each of the plurality of cell groups.

29. The method for transmission timing control according to claim 28, wherein uplink-signal transmission is stopped in a cell group for which an uplink-signal transmission timing adjustment value is not received.

30. The method for transmission timing control according to claim 24, wherein each of the plurality of cell groups comprises cells to which a same uplink-signal transmission timing adjustment value is applied.

31. The method for transmission timing control according to claim 24, wherein the plurality of cell groups includes a first cell group including at least a specific cell, and at least one second cell group including only cells other than the specific cell.

32. The method for transmission timing control according to claim 31, wherein a synchronization timer configured to provide data for determining uplink-signal synchronization in the cell groups is provided, wherein the synchronization timer is configured to provide data for uplink-signal transmission timing control on the first cell group.

33. The method for transmission timing control according to claim 32, further comprising, in response to an uplink signal in the first cell group losing synchronization, stopping the synchronization timer to stop uplink-signal transmission.

34. A radio communications system in which a radio station and a radio terminal are configured to communicate with each other by using a plurality of radio resources that correspond to a plurality of cells, wherein the plurality of cells includes a first cell and a second cell and are associated with a plurality of cell groups, wherein the radio station comprises:
a first memory device that stores a first set of instructions; and
at least one first processor configured to execute the first set of instructions to:
calculate at least one of a first uplink-signal transmission timing adjustment value for the first cell and a second uplink-signal transmission timing adjustment value for the second cell;
determine whether at least one of the first and second cells is in uplink-signal synchronization with the radio station; and
responsive to determining that the first cell is in uplink-signal synchronization with the radio station and the second cell is not in uplink-signal synchronization with the radio station, transmit the first uplink-signal transmission timing adjustment value to the radio terminal, wherein the second uplink-signal transmission timing adjustment value is excluded from the transmission;
wherein the radio terminal comprises:
a second memory device that stores a second set of instructions and;
at least one second processor configured to execute the second set of instructions to receive the uplink-signal transmission timing adjustment values for at least one of the first cells and the second cells from the radio station.

35. The radio communications system according to claim 34, wherein the at least one second processor of the radio terminal is configured to execute the second set of instructions to determine whether an uplink-signal transmission timing adjustment value is received for each of the plurality of cell groups.

36. The radio communications system according to claim 34, wherein the at least one first processor of the radio station is further configured to execute the first set of instructions to determine, for each of the plurality of cell groups, whether to enable or to disable uplink-signal transmission, based on whether or not an uplink-signal transmission timing adjustment value is received for each of the plurality of cell groups.

37. The radio communications system according to claim 34, wherein the radio station is a radio base station or a radio station controller.

38. The radio communication system of claim 34, wherein the at least one first processor is configured to execute the first set of instructions to, responsive to determining that the first cell is in synchronization with the radio station and that the second cell is not in uplink-signal synchronization with the radio station, transmit the uplink-signal transmission timing adjustment value calculated for the first cell to the radio terminal, wherein an uplink-transmission timing adjustment value associated with the second cell is excluded from the transmission.

39. A radio station configured to communicate with a radio terminal by using a plurality of radio resources that correspond respectively to a plurality of cells, wherein the plurality of cells includes a first cell and a second cell and are associated with a plurality of cell groups, comprising:
   a memory device that stores a set of instructions; and
   at least one processor configured to execute the set of instructions to:
      calculate an uplink-signal transmission timing adjustment value for at least one of the first and second cells;
      determine whether at least one of the first and second cells is in uplink-signal synchronization with the radio station;
      responsive to determining that the at least one of the first and second cells are in uplink-signal synchronization with the radio station, transmit the uplink-signal transmission timing adjustment values calculated for the at least one of the first and second cells to the radio terminal, wherein an uplink-transmission timing adjustment value associated with a cell that is not in uplink-signal synchronization with the radio station is excluded from the transmission.

40. The radio station according to claim 39, wherein
   responsive to determining that the first and second cells are in uplink-signal synchronization with the radio station, the uplink-signal transmission timing adjustment values calculated for the first and second cells are transmitted to the radio terminal, and
   responsive to determining that the first cell is in synchronization with the radio station and that the second cell is not in uplink-signal synchronization with the radio station, the uplink-signal transmission timing adjustment value calculated for the first cell is transmitted to the radio terminal, wherein an uplink-transmission timing adjustment value associated with the second cell is excluded from the transmission.

41. A method for transmission timing control at a radio station configured to communicate with a radio terminal by using a plurality of radio resources that correspond respectively to a plurality of cells, wherein the plurality of cells includes a first cell and a second cell and are associated with a plurality of cell groups, comprising:
   calculating an uplink-signal transmission timing adjustment value for at least one of the first and second cells;
   determining whether at least one of the first and second cells is in uplink-signal synchronization with the radio station;
   responsive to determining that the at least one of the first and second cells are in uplink-signal synchronization with the radio station, transmitting the uplink-signal transmission timing adjustment values calculated for the at least one of the first and second cells to the radio terminal, wherein an uplink-transmission timing adjustment value associated with a cell that is not in uplink-signal synchronization with the radio station is excluded from the transmission.

42. The method for transmission timing control according to claim 41, wherein responsive to determining that the first and second cells are in uplink-signal synchronization with the radio station, the uplink-signal transmission timing adjustment values calculated for the first and second cells are transmitted to the radio terminal, and
   responsive to determining that the first cell is in synchronization with the radio station and that the second cell is not in uplink-signal synchronization with the radio station, the uplink-signal transmission timing adjustment value calculated for the first cell is transmitted to the radio terminal, wherein an uplink-transmission timing adjustment value associated with the second cell is excluded from the transmission.

* * * * *